United States Patent
Kajita

(10) Patent No.: US 11,126,025 B2
(45) Date of Patent: Sep. 21, 2021

(54) IN-CELL TOUCH PANEL

(71) Applicant: Panasonic Liquid Crystal Display Co., Ltd., Himeji (JP)

(72) Inventor: Daisuke Kajita, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/784,806

(22) Filed: Feb. 7, 2020

(65) Prior Publication Data
US 2020/0278571 A1 Sep. 3, 2020

(30) Foreign Application Priority Data

Feb. 28, 2019 (JP) .............................. JP2019-035692
Feb. 28, 2019 (JP) .............................. JP2019-035902

(51) Int. Cl.
| | | |
|---|---|---|
| G06F 3/044 | (2006.01) | |
| G02F 1/1333 | (2006.01) | |
| G02F 1/1362 | (2006.01) | |
| G02F 1/1343 | (2006.01) | |
| G06F 3/041 | (2006.01) | |
| G02F 1/1368 | (2006.01) | |

(52) U.S. Cl.
CPC .... *G02F 1/13338* (2013.01); *G02F 1/134327* (2013.01); *G02F 1/136286* (2013.01); *G06F 3/044* (2013.01); *G06F 3/0412* (2013.01); *G02F 1/1368* (2013.01); *G02F 1/134318* (2021.01); *G06F 2203/04111* (2013.01)

(58) Field of Classification Search
CPC ........... G02F 1/13338; G02F 1/136286; G02F 1/134327; G02F 1/134318; G02F 1/1368; G06F 3/044; G06F 3/0412; G06F 2203/04111; G06F 3/04166; G06F 3/04164; G06F 3/0443
See application file for complete search history.

(56) References Cited

U.S. PATENT DOCUMENTS

| | | | |
|---|---|---|---|
| 10,928,966 B2* | 2/2021 | Kim ..................... | G06F 3/0412 |
| 2008/0068516 A1* | 3/2008 | Mori .................... | G09G 3/3648 348/790 |
| 2014/0043274 A1* | 2/2014 | Yao ....................... | G06F 3/0443 345/173 |
| 2017/0220185 A1* | 8/2017 | Kurasawa ............. | G06F 3/0446 |
| 2018/0120997 A1* | 5/2018 | Moon ................. | H01L 27/3262 |
| 2019/0114023 A1* | 4/2019 | Gotoh ............... | G02F 1/136213 |
| 2019/0196638 A1* | 6/2019 | Tominaga ........... | G02F 1/13338 |

(Continued)

FOREIGN PATENT DOCUMENTS

WO 2017/213173 12/2017

*Primary Examiner* — Carolyn R Edwards
(74) *Attorney, Agent, or Firm* — Hamre, Schumann, Mueller & Larson, P.C.

(57) ABSTRACT

An in-cell touch panel includes: common electrodes arranged in a first direction and a second direction, respectively facing one or more of pixel electrodes and provided separately from each other; and touch lines that extend along the second direction and are each connected to a corresponding one of the common electrodes. Each common electrode has segment electrodes divided with an area on the gate line as a division area, and each segment electrode included in one of the common electrodes is connected by at least one of the touch lines.

18 Claims, 19 Drawing Sheets

(56) References Cited

U.S. PATENT DOCUMENTS

| | | | |
|---|---|---|---|
| 2019/0220185 A1* | 7/2019 | Cho | G06F 3/04883 |
| 2020/0210018 A1* | 7/2020 | Kim | G09G 3/3685 |
| 2020/0278766 A1* | 9/2020 | Kajita | G09G 3/3648 |
| 2020/0285088 A1* | 9/2020 | Xu | H01L 27/1288 |

\* cited by examiner

IN-CELL TOUCH PANEL

CROSS-REFERENCE TO RELATED APPLICATION

This application claims priority from Japanese application JP 2019-035692, filed on Feb. 28, 2019, and Japanese application JP 2019-035902, filed on Feb. 28, 2019. These Japanese applications are incorporated herein by reference.

TECHNICAL FIELD

The present disclosure relates to an in-cell touch panel.

BACKGROUND

In recent years, a liquid crystal display device having both a touch function and a display function has been developed. In a liquid crystal display device having a touch function, for example, touch sensing is performed by a capacitance method. In this case, a position touched by a user is sensed by detecting, with a touch electrode, a change in capacitance generated when a pointer such as the user's finger or pen touches or approaches a display screen.

As the touch sensing by the capacitance method, there is known a self-capacitive method that detects a change in capacitance between a touch object such as the finger or pen and a touch electrode (Rx electrode) when the touch object touches the liquid crystal display device, and a mutual capacitive method that detects a change in capacitance between two touch electrodes (Rx electrode, Tx electrode).

As a structure of a liquid crystal display device having a touch function, there are known an out-cell method in which a touch panel having the touch function is attached to the surface of the liquid crystal display panel and an in-cell method in which the liquid crystal display device itself has the touch function.

For example, International Publication No. 2017/213173 discloses an in-cell type liquid crystal display device having a touch function. The liquid crystal display device disclosed in International Publication No. 2017/213173 includes a plurality of gate lines extending in the row direction, a plurality of data lines extending in the column direction, a pixel electrode provided in each of the plurality of pixels, a plurality of common electrodes (counter electrodes) provided facing the plurality of pixel electrodes, and signal lines connected to the common electrodes as touch lines. In the liquid crystal display device disclosed in International Publication No. 2017/213173, a touch drive signal for detecting a touch position is supplied to the counter electrode, so that a touch detection signal is received via the signal line, and a change in capacitance at the position of the counter electrode is detected to sense the touch position.

SUMMARY

In an in-cell touch panel that is an in-cell type liquid crystal display device having a touch function, a plurality of common electrodes are arranged in a matrix to detect a touch position. That is, each of the plurality of common electrodes becomes a unit electrode for detecting the touch position. In this case, two common electrodes (touch electrodes) adjacent in the column direction are separated from each other with an area on a gate line as a separation area.

However, since each separated common electrode is formed over a plurality of pixels, each common electrode not only faces a plurality of pixel electrodes but also partially faces a gate line formed between two pixels adjacent in the column direction. That is, a boundary portion between two common electrodes adjacent in the column direction does not face the gate line, but each of the two common electrodes partially faces another gate line.

For this reason, the quality of a displayed image is degraded due to common distortion caused by a coupling capacitance (Cgc) between the gate line and the common electrode. In particular, with a pulsed gate signal being applied to the gate line, the influence of the coupling capacitance between the gate line and the common electrode is larger than the influence of the coupling capacitance between the data line and the common electrode.

A first object of the present disclosure provides an in-cell touch panel that can prevent degradation of image quality even when each of a plurality of common electrodes is provided over a plurality of pixels.

Further, in the in-cell touch panel that is an in-cell type liquid crystal display device having a touch function, as described above, each of the plurality of common electrodes is a unit electrode for detecting a touch position, so that two common electrodes (touch electrodes) adjacent in the row direction are separated from each other with an area on the data line as a separation area, and a gap (slit) is formed between the two common electrodes.

However, when a gap arises between two common electrodes adjacent in the row direction, liquid crystal molecules existing in the vicinity of the gap are unintentionally rotated by an electromagnetic field from the data line existing below the gap. As a result, display unevenness occurs, and the quality of the displayed image is degraded.

A second object of the present disclosure provides an in-cell touch panel that can prevent degradation of image quality even when a plurality of common electrodes are separated.

To solve the first object, an in-cell touch panel according to a present disclosure has an image display area made up of pixels arranged in a first direction and a second direction intersecting the first direction. The in-cell touch panel includes: transistors and pixel electrodes respectively provided in the pixels; common electrodes arranged in the first direction and the second direction, respectively facing one or more of the pixel electrodes and provided separately from each other; gate lines that extend along the first direction and supply gate signals to the transistors respectively; data lines that extend along the second direction and supply data signals to the transistors respectively; and touch lines that extend along the second direction and are each connected to a corresponding one of the common electrodes. Each common electrode has segment electrodes divided with an area on the gate line as a division area, and each segment electrode included in one of the plurality of common electrodes is connected by at least one of the touch lines.

To solve the second object, an in-cell touch panel according to another present disclosure has an image display area made up of pixels arranged in a first direction and a second direction intersecting the first direction. The in-cell touch panel includes: transistors and pixel electrodes respectively provided in the pixels; common electrodes arranged in the first direction and the second direction, respectively facing one or more of the pixel electrodes and provided separately from each other; gate lines that extend along the first direction and supply gate signals to the transistors respectively; data lines that extend along the second direction and supply data signals to the transistors respectively; touch lines that extend along the second direction and are each connected to a corresponding one of the common electrodes;

and a dummy touch line that extends along the second direction, is formed in a same layer as the touch lines, and is not electrically connected to any of the common electrodes. The touch lines are connected one-by-one with the common electrodes arranged in the second direction among the common electrodes, two of the common electrodes adjacent in the first direction are separated from each other with at least an area on the data line as a separation area, and the dummy touch line is provided in the separation area.

DETAILED DESCRIPTION

Figure 1:
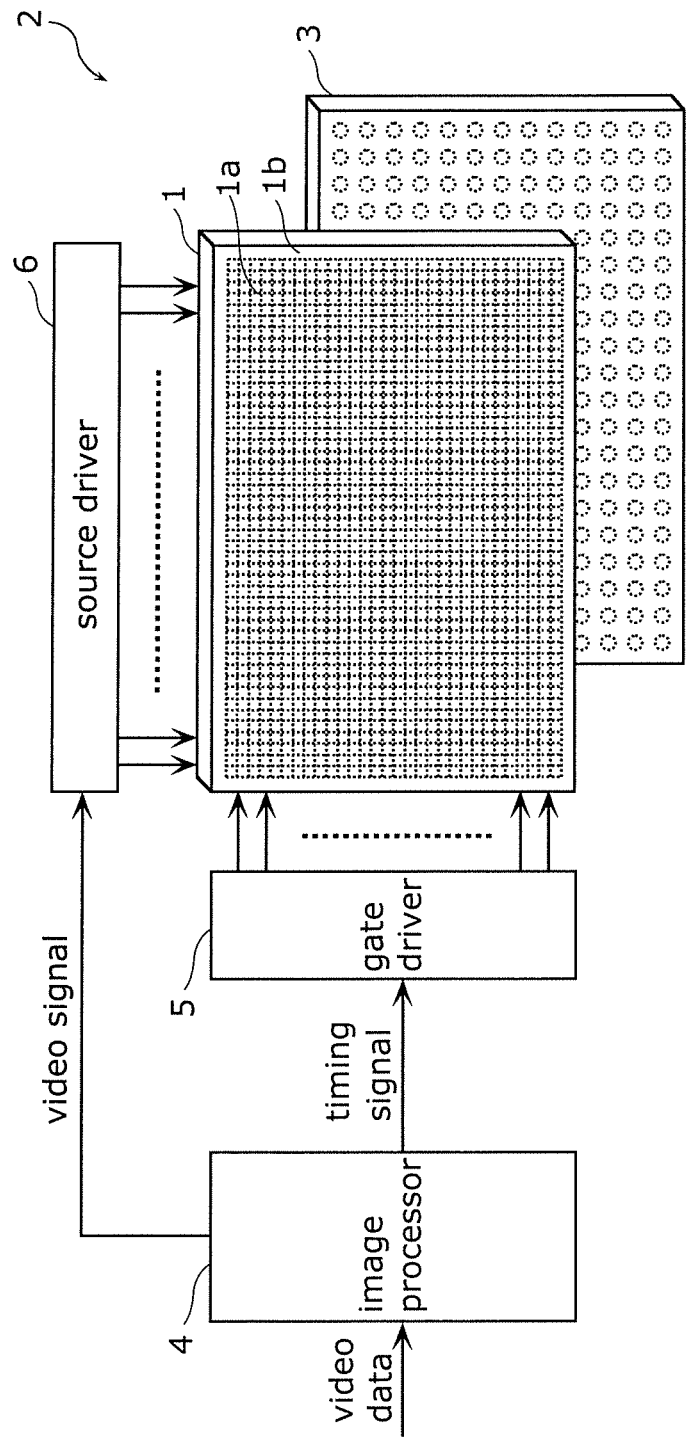
FIG. 1 is a diagram schematically illustrating a schematic configuration of an in-cell touch panel according to a first exemplary embodiment.

Hereinafter, exemplary embodiments will be described with reference to the drawings. The following exemplary embodiments provide comprehensive or specific examples of the present disclosure. Numerical values, shapes, materials, components, disposition positions of the components, connection modes of the components, steps, and order of the steps that are illustrated in the following exemplary embodiments are examples, and therefore are not intended to limit the present disclosure. Among the components in the following exemplary embodiments, the components that are not recited in the independent claims indicating the broadest concept are described as an optional component.

The drawings are schematic diagrams, and not necessarily strictly illustrated. In the drawings, substantially the same configuration is designated by the same reference numerals, and overlapping description will be omitted or simplified.

First Exemplary Embodiment

Figure 2:
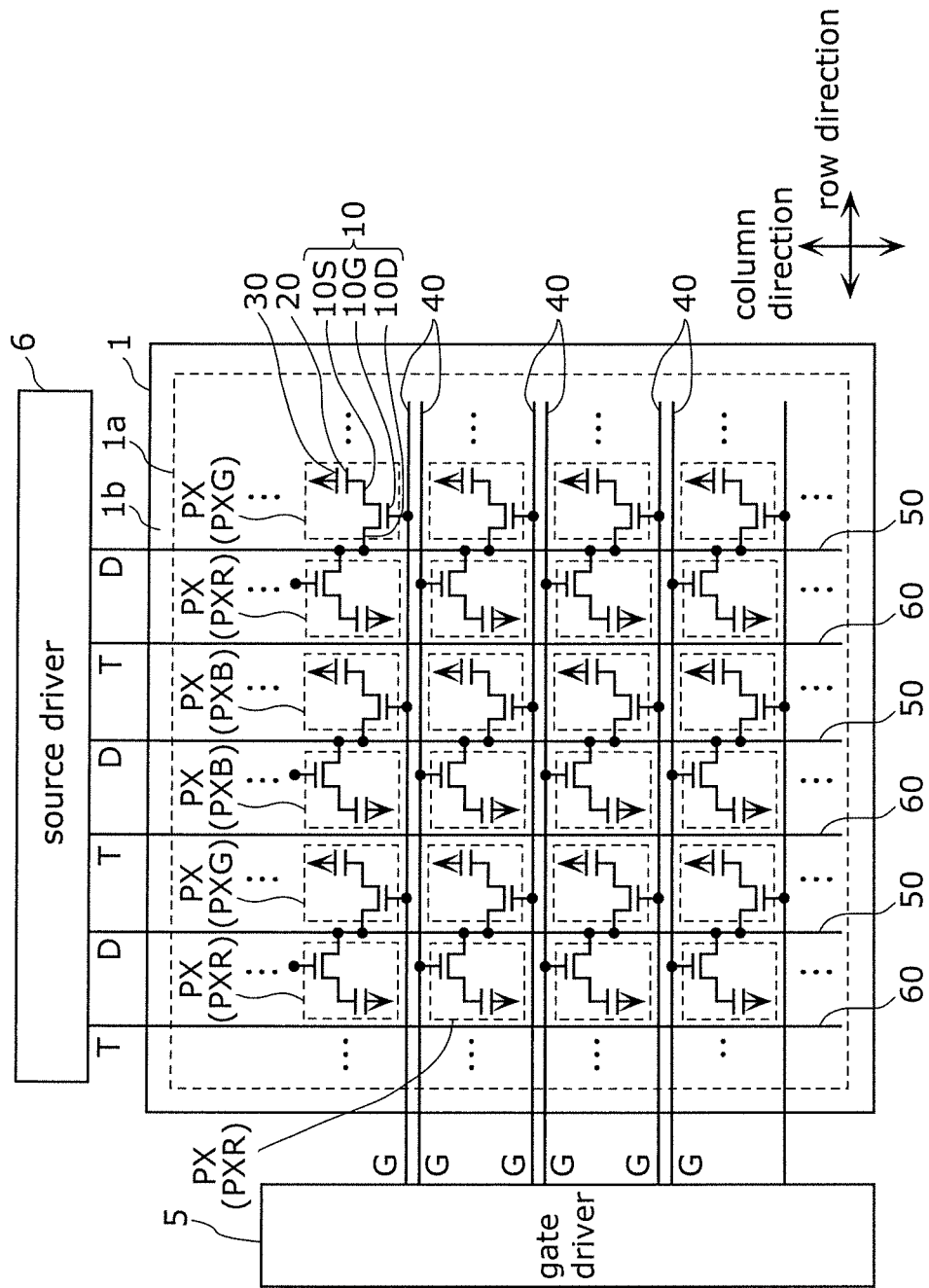
FIG. 2 is a diagram illustrating a pixel circuit of an in-cell touch panel used in an image display device according to the first exemplary embodiment.
Figure 3:
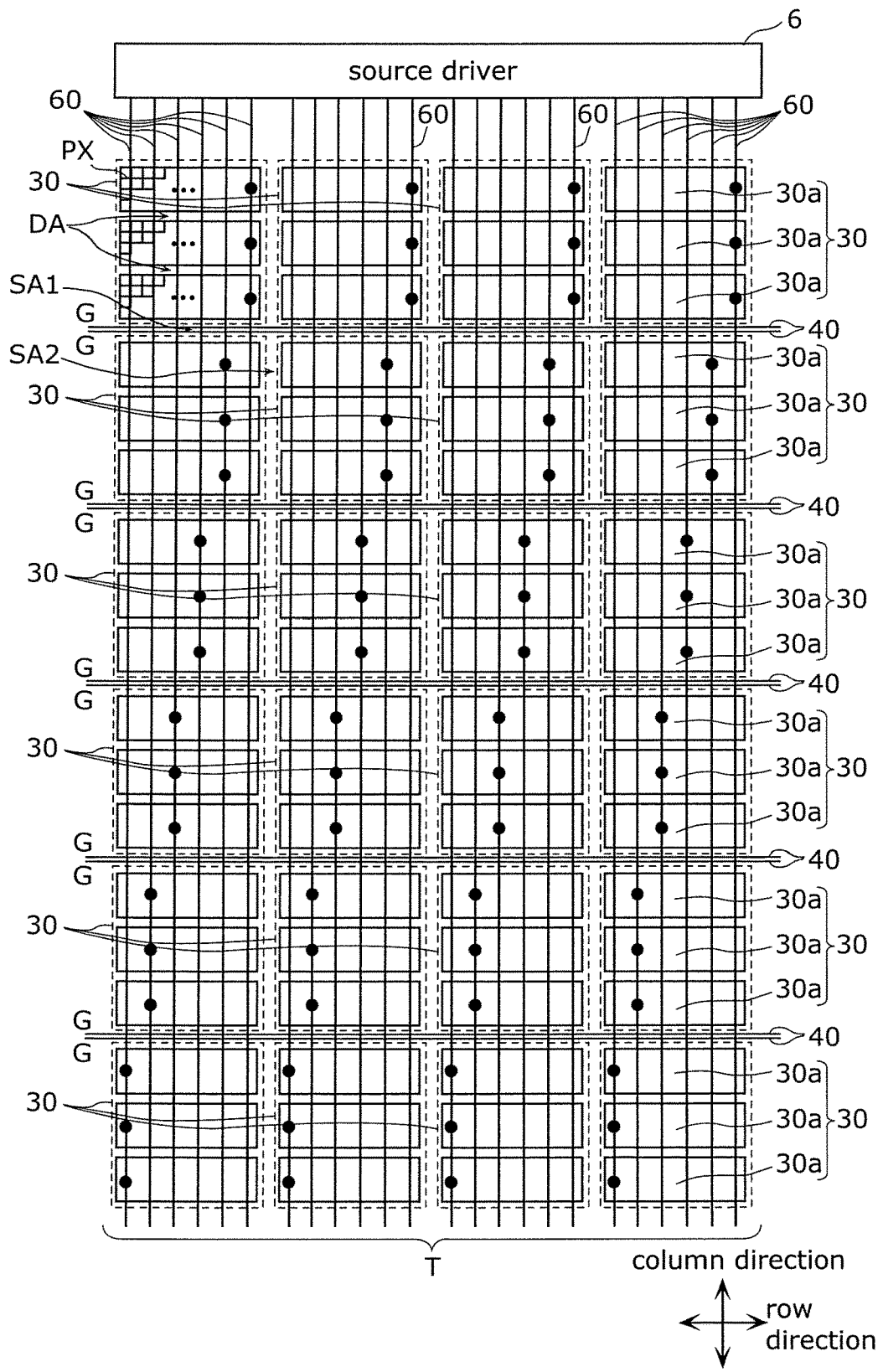
FIG. 3 is a diagram illustrating an example of arrangement of common electrodes in the in-cell touch panel according to the first exemplary embodiment.

First, a schematic configuration of image display device 2 using in-cell touch panel 1 according to the first exemplary embodiment will be described with reference to FIGS. 1 to 3. FIG. 1 is a diagram schematically illustrating a schematic configuration of image display device 2 according to the first exemplary embodiment. FIG. 2 is a diagram illustrating a pixel circuit of in-cell touch panel 1 used in image display device 2. FIG. 3 is a diagram illustrating an example of arrangement of common electrodes 30 in in-cell touch panel 1. In FIG. 2, "G" indicates gate line 40, "D" indicates data line 50, and "T" indicates touch line 60. In FIG. 3, a black circle indicates a contact portion between common electrode 30 and touch line 60.

Image display device 2 is an example of a display device that displays a still image or a moving image (video). As illustrated in FIG. 1, image display device 2 includes in-cell touch panel 1, backlight 3, and image processor 4.

In-cell touch panel 1 is a liquid crystal display panel on which an image is displayed. In-cell touch panel 1 is disposed on the light emission side of backlight 3. Hence light emitted from backlight 3 enters in-cell touch panel 1.

The liquid crystal drive method for in-cell touch panel 1 is a horizontal electric field method such as in-plane switching (IPS) and fringe field switching (FFS). In in-cell touch panel 1, for example, voltage control is performed by a normally black method, but the voltage control method is not limited to the normally black method.

As illustrated in FIGS. 1 and 2, in-cell touch panel 1 includes image display area 1a (active area) and frame area 1b surrounding image display area 1a. A color image or a monochrome image is displayed in image display area 1a.

Image display area 1a is a display area (effective area) where an image is displayed, and includes, for example, a plurality of pixels PX arranged in a first direction and a second direction intersecting the first direction. In the present exemplary embodiment, the first direction and the second direction are orthogonal to each other. Specifically, the first direction is a row direction, and the second direction is a column direction orthogonal to the row direction. Thus, image display area 1a is made up of a plurality of pixels PX arranged in the row direction and the column direction. That is, the plurality of pixels PX are arranged in a matrix.

Frame area 1b is a peripheral area of in-cell touch panel 1 and is located outside image display area 1a. Frame area b is a non-display area (ineffective area) where no image is displayed. In the present exemplary embodiment, a planar view shape of in-cell touch panel 1 is a rectangular shape. Therefore, a planar view shape of image display area 1a is a rectangular shape, and a planar view shape of frame area 1b is a rectangular frame shape.

The plurality of pixels PX are made up of a plurality of types of pixels arranged periodically and repeatedly along the row direction. Specifically, the plurality of pixels PX are made up of three types of pixels, red pixel PXR, green pixel PXG, and blue pixel PXB. In this case, in the present exemplary embodiment, the three pixels of red pixel PXR, green pixel PXG, and blue pixel PXB are arranged in this order as a set repeatedly along the row direction. Further, the same kind of pixels PX are arranged in the column direction. Note that the arrangement order of red pixel PXR, green pixel PXG, and blue pixel PXB is not limited to this.

As illustrated in FIG. 2, in-cell touch panel 1 includes transistor 10 and pixel electrode 20 provided in pixels PX, and common electrode 30 facing the pixel electrode 20.

Further, in-cell touch panel 1 is provided with a plurality of gate lines 40 (scanning lines) extending in the row direction that is the first direction, and a plurality of data lines 50 (video signal lines) extending in the column direction that is the second direction orthogonal to the first direction. Each pixel PX is an area surrounded by gate line 40 extending in the row direction and data line 50 extending in the column direction.

In-cell touch panel 1 in the present exemplary embodiment is an in-cell liquid crystal display panel having a touch function as well as a display function. Thus, in-cell touch panel 1 further includes a plurality of touch lines 60 for detecting a touch position when a user touches in-cell touch panel 1. The plurality of touch lines 60 extend in the same direction as the plurality of data lines 50. Specifically, the plurality of touch lines 60 extend in the column direction.

Transistor 10 is a thin film transistor and includes gate electrode 10G, source electrode 10S, and drain electrode 10D. In the present specification, source electrode 10S and drain electrode 10D may be collectively referred to as a source-drain electrode, and the source-drain electrode means at least one of source electrode 10S and drain electrode 10D, either source electrode 10S or drain electrode 10D, or both source electrode 10S and drain electrode 10D.

Pixel electrode 20 is provided in each of the plurality of pixels PX. Pixel electrode 20 is provided, for example, at an intersection of gate line 40 and data line 50. In each of the plurality of pixels PX, pixel electrode 20 is connected to gate line 40 and data line 50 corresponding to the concerned pixel PX via transistor 10 corresponding to the concerned pixel PX.

In the present exemplary embodiment, one transistor 10 and one pixel electrode 20 are provided for each pixel PX. A plurality of transistors 10 and pixel electrodes 20 may be provided for each pixel PX.

Common electrode 30 is a counter electrode facing pixel electrode 20. As illustrated in FIG. 3, in the present exemplary embodiment, a plurality of common electrodes 30 are provided. The plurality of common electrodes 30 are arranged in each of the row direction and the column direction. That is, the plurality of common electrodes 30 are arranged in a matrix. The same common voltage (Vcom) is applied to each of the plurality of common electrodes 30.

Each of the plurality of common electrodes 30 has a rectangular shape and faces one or more pixel electrodes 20. In the present exemplary embodiment, each of the plurality of common electrodes 30 has a rectangular shape provided across the plurality of pixels PX, and faces the plurality of pixel electrodes 20 corresponding to the plurality of pixels PX present in the rectangular area. For example, the plurality of common electrodes 30 are formed in a rectangular shape with one edge made up of a plurality of pixels PX that are several to several tens of pixels PX.

In-cell touch panel 1 according to the present exemplary embodiment is a liquid crystal display panel having a touch sensing function by a capacitance method that is a self-capacitance method. Hence, common electrode 30 is also a touch electrode that forms a capacitance with pixel electrode 20. That is, common electrode 30 is paired with pixel electrode 20 and is used not only at the time of image display drive but also at the time of touch position detection drive. Each of the plurality of common electrodes 30 is a unit electrode (touch electrode) for detecting a touch position.

The plurality of common electrodes 30 are separated from each other using at least one of an area above gate line 40 and an area above data line 50 as a separation area. In the present exemplary embodiment, the plurality of common electrodes 30 are arranged in a matrix, and are separated from each other using both the area above gate line 40 and the area above data line 50 as the separation areas.

Two common electrodes 30 adjacent in the column direction are separated from each other with an area above gate line 40 as first separation area SA1. That is, two common electrodes 30 adjacent in the column direction are divided with first separation area SA1 as a boundary, and do not face gate line 40 in first separation area SA1. First separation area SA1 that separates common electrode 30 in the column direction is a touch-electrode boundary and extends along the row direction.

Further, two common electrodes 30 adjacent in the row direction are separated from each other with an area above data line 50 as second separation area SA2. That is, two common electrodes 30 adjacent in the row direction are divided with second separation area SA2 as a boundary, and do not face data line 50 in second separation area SA2. Second separation area SA2 that separates common electrode 30 in the row direction is a touch-electrode boundary and extends along the column direction.

In the present exemplary embodiment, each of the plurality of common electrodes 30 includes a plurality of segment electrodes 30a divided with an area on gate line 40 as division area DA. That is, each common electrode 30 is divided in a plurality of segment electrodes 30a with the area on gate line 40 as a boundary. Accordingly, each segment electrode 30a does not face gate line 40 in division area DA. Division area DA extends along the row direction similarly to first separation area SA1.

Each segment electrode 30a is formed over a plurality of pixels PX arranged in the row direction. Each segment electrode 30a may be formed over a plurality of pixels PX arranged not only in the row direction but also in the column direction, but is preferably formed over a plurality of pixels PX corresponding to only one row.

At least one touch line 60 connects divided segment electrodes 30a in one common electrode 30 with each other. That is, each common electrode 30 is divided in a plurality of segment electrodes 30a, but constitutes one unit electrode for detecting the touch position. Therefore, each of the plurality of segment electrodes 30a included in one common electrode 30 is electrically connected to each other by at least one touch line 60. FIG. 3 illustrates an example where each common electrode 30 is divided in three segment electrodes 30a, and three segment electrodes 30a are connected by one touch line 60.

Gate lines 40 extending in the row direction supplies a gate signal to transistor 10. Gate line 40 is provided in a boundary portion between two pixels PX adjacent in the column direction in image display area 1a.

Specifically, each gate line 40 is provided between two pixel rows adjacent in the column direction.

Gate line 40 is connected to transistors 10 of pixels PX arranged in the row direction. Specifically, gate line 40 is connected to gate electrode 10G of each transistor 10.

In the present exemplary embodiment, in-cell touch panel 1 has a dual-gate structure and a 2G1D wiring connection structure. Therefore, two of the plurality of gate lines 40 are provided for each boundary portion between two pixels PX adjacent in the column direction. That is, two gate lines 40 are provided for each boundary portion between two pixel columns adjacent in the column direction. Therefore, two gate lines 40 exist in first separation area SA1 and division area DA between two common electrodes 30 adjacent in the column direction.

Data lines 50 extending in the column direction supplies a data signal (video signal) to transistor 10. Data line 50 is provided in a boundary portion between two pixels PX adjacent in the row direction in image display area 1a. Specifically, data line 50 is provided between two pixel columns adjacent in the row direction.

Data line 50 is connected to transistors 10 of pixels PX arranged in the column direction. Specifically, data line 50 is connected to drain electrode 10D of transistor 10. That is, in the present exemplary embodiment, data line 50 is a drain line.

touch line 60 extending in the column direction is provided in the boundary portion between two pixels PX adjacent in the row direction in image display area 1a, similarly to data line 50. Specifically, touch line 60 is provided between two pixel columns adjacent in the row direction.

As illustrated in FIG. 3, touch lines 60 are connected one-by-one to common electrodes 30 arranged in the column direction. Specifically, touch lines 60 (column touch line group) disposed in a group of common electrodes 30 arranged in the column direction is provided so as to traverse all of the common electrodes 30 included in the concerned group. However, touch line 60 is connected to only one of common electrodes 30 included in the concerned group. Therefore, common electrode 30 is connected to any one of touch lines 60 traversing the concerned common electrode 30, but is not connected to and is insulated from the other remaining touch lines 60. The number of touch lines 60 across the common electrodes 30 arranged in the column direction only needs to be the same as that of the common electrodes 30 arranged in the column direction.

As will be described in detail later, touch line 60 and common electrode 30 are formed via an insulating film, and touch line 60 and common electrode 30 corresponding to the concerned touch line 60 are connected via a contact hole formed in the insulating film. This contact hole becomes a contact portion that connects touch line 60 and common electrode 30.

The plurality of data lines 50 and the plurality of touch lines 60 are alternately and repeatedly provided one by one for each boundary portion between two pixels PX adjacent in the row direction. Specifically, each of data line 50 and touch line 60 is provided by being thinned out for each pixel column, and is provided for every two pixel columns adjacent in the row direction (every two columns) so as to be arranged alternately. For example, when data line 50 is provided in an odd-numbered column of pixel PX, touch line 60 is provided in an even-numbered column of pixel PX. On the contrary, when data line 50 is provided in the even-numbered row of pixel PX, touch line 60 is provided in the odd-numbered row of pixel PX.

As illustrated in FIG. 1, in-cell touch panel 1 includes gate driver 5 and source driver 6 in order to display an image corresponding to an input video signal. Gate driver 5 and source driver 6 are driver integrated circuits (ICs) (IC packages), for example.

Gate driver 5 and source driver 6 are mounted in frame area 1b of in-cell touch panel 1. Specifically, gate driver 5 and source driver 6 are mounted on an end of in-cell touch panel 1 by a chip on film (COF) method or a chip on glass (COG) method.

When gate driver 5 and source driver 6 are to be mounted by the COF method, a COF made of an anisotropic conductive film (ACF) having gate driver 5 or source driver 6 mounted on a flexible wiring board such as a flexible flat cable (FFC) or a flexible printed cable (FPC), is connected to an electrode terminal, provided at the end of in-cell touch panel 1, by thermocompression bonding.

On the other hand, when gate driver 5 and source driver 6 are to be mounted by the COG method, gate driver 5 and source driver 6 are directly mounted on an active matrix substrate of in-cell touch panel 1.

Note that both gate driver 5 and source driver 6 are not limited to being mounted by the COF method or the COG method, but one of gate driver 5 and source driver 6 may be mounted by the COF method and the other may be mounted by the COG method.

As illustrated in FIG. 2, gate driver 5 is electrically connected to gate line 40. Gate driver 5 selects pixel PX where a data signal is written in accordance with a timing signal input from image processor 4, and supplies a voltage (gate-on voltage; Vgon) for turning on transistor 10 of the selected pixel PX to gate line 40. Thereby, a data voltage is supplied to pixel electrode 20 of the selected pixel PX via transistor 10.

Source driver 6 is connected to data line 50 of in-cell touch panel 1. Source driver 6 supplies a voltage (data voltage) corresponding to a video signal input from image processor 4 to data line 50 in accordance with selection of gate line 40 by gate driver 5.

In the present exemplary embodiment, a source driver with a touch function is used as source driver 6. The source driver with a touch function is a driver in which an image display circuit necessary at the time of performing the image display drive and a touch position detection circuit necessary at the time of performing the touch position detection drive are shared. In the present exemplary embodiment, the plurality of data lines 50 and the plurality of touch lines 60 are connected to source driver 6 that is a source driver with a touch function. The source driver with a touch function supplies a common voltage (Vcom) to common electrode 30.

In the present exemplary embodiment, gate driver 5 is mounted, for example, at the end of in-cell touch panel 1 on the row direction side. Further, source driver 6 is mounted, for example, at the end of in-cell touch panel 1 on the column direction side. The mounting locations for driver 5 and source driver 6 are not limited to these, but both gate driver 5 and source driver 6 may be mounted at the same end of in-cell touch panel 1 on the column direction side, or may be mounted at the same end of in-cell touch panel 1 on the row direction side.

As illustrated in FIG. 1, backlight 3 is disposed on the back surface side of in-cell touch panel 1 and irradiates in-cell touch panel 1 with light. In the present exemplary embodiment, backlight 3 is a light emitting diode (LED) backlight using an LED as a light source, but backlight 3 is not limited thereto. Backlight 3 is a direct type LED backlight in which LEDs are two-dimensionally arranged on a substrate so as to face in-cell touch panel 1, but backlight 3 may be an edge type backlight. Backlight 3 is a surface emitting unit that emits planar uniform scattered light (diffused light). Backlight 3 may have an optical member such as a diffusion plate (diffusion sheet) in order to diffuse light from the light source.

Image processor 4 is a control device provided with an arithmetic processing circuit such as a central processing unit (CPU) and memories such as a read-only memory (ROM) and a random-access memory (RAM). Video data to be displayed on in-cell touch panel 1 is input into image processor 4. In image processor 4, the CPU reads out and executes programs stored in the memory, thereby executing various types of processing. Specifically, image processor 4 includes a timing controller or the like that performs various types of image signal processing such as color adjustment on video data input from an external system (not illustrated), to generate a video signal indicating a gradation value of each pixel PX and a timing signal indicating the timing for writing the video signal into each pixel PX. Image processor 4 outputs the video signal to source driver 6 and outputs the timing signal to gate driver 5.

Figure 4A:
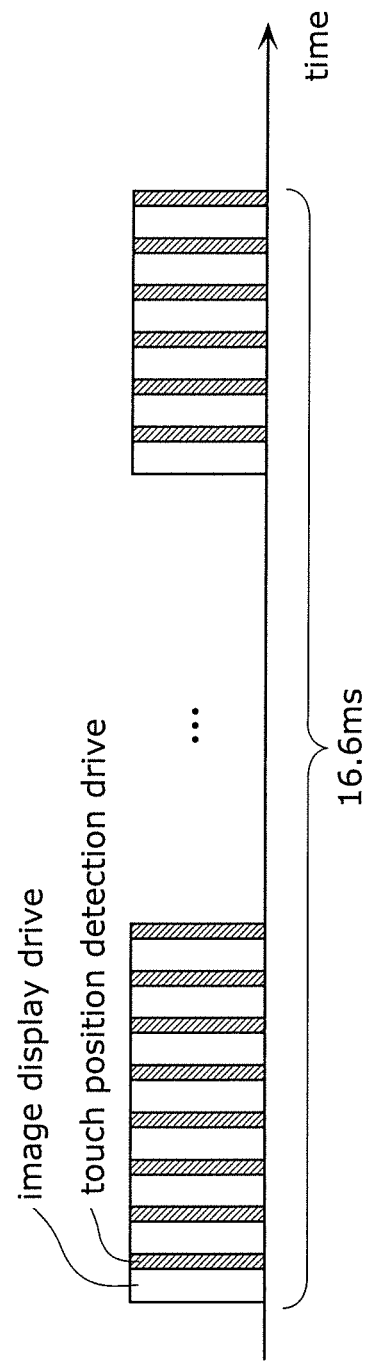
FIG. 4A is a diagram illustrating an example of image display drive and touch position detection drive in the in-cell touch panel.
Figure 4B:
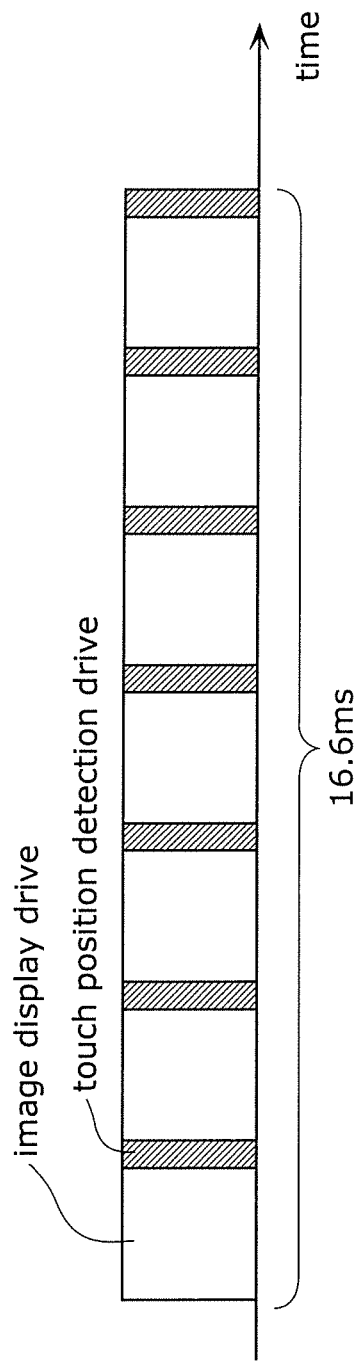
FIG. 4B is a diagram illustrating another example of the image display drive and the touch position detection drive in the in-cell touch panel.

In-cell touch panel 1 in the present exemplary embodiment has a display function and a touch function. That is, in-cell touch panel 1 performs the image display drive and the touch position detection drive. In this case, in-cell touch panel 1 uses touch line 60 to perform the image display drive and the touch position detection drive by time division. For example, as illustrated in FIGS. 4A and 4B, the image display drive and the touch position detection drive are alternately repeated a plurality of times within one frame period (16.6 ms). In this case, the touch position detection drive can be performed using, for example, a blanking period.

At the time when in-cell touch panel 1 performs the image display drive, a gate-on voltage is supplied from gate driver 5 to gate line 40. Thereby, transistor 10 of the selected pixel PX is turned on, and the data voltage is supplied to pixel electrode 20 from data line 50 connected to transistor 10. Then, an electric field is generated in the liquid crystal layer due to the difference between the data voltage supplied to pixel electrode 20 and the common voltage supplied to common electrode 30. With this electric field, an alignment state of liquid crystal molecules in the liquid crystal layer in each pixel PX changes to control a transmittance of light of backlight 3, which passes through in-cell touch panel 1, for each pixel PX. As a result, a desired image is displayed in image display area 1*a* of in-cell touch panel 1.

Further, at the time when in-cell touch panel 1 performs the touch position detection drive, source driver 6 which is the source driver with a touch function detects, as a touch detection signal, the change in capacitance of each of the plurality of common electrodes 30 via touch line 60. It is thereby possible to specify common electrode 30 at the touched position and detect the position touched by the user.

The control illustrated in FIG. 4B has a long drive period per image display drive and touch position detection drive as compared to the control illustrated in FIG. 4A. In the present exemplary embodiment, either the control illustrated in FIG. 4B or the control illustrated in FIG. 4A may be used. However, in the control illustrated in FIG. 4B, as compared to the control illustrated in FIG. 4A, the amount of image data that is stored into the memory during the touch position detection drive becomes large, thus increasing the chip size of the IC driver.

Figure 5:
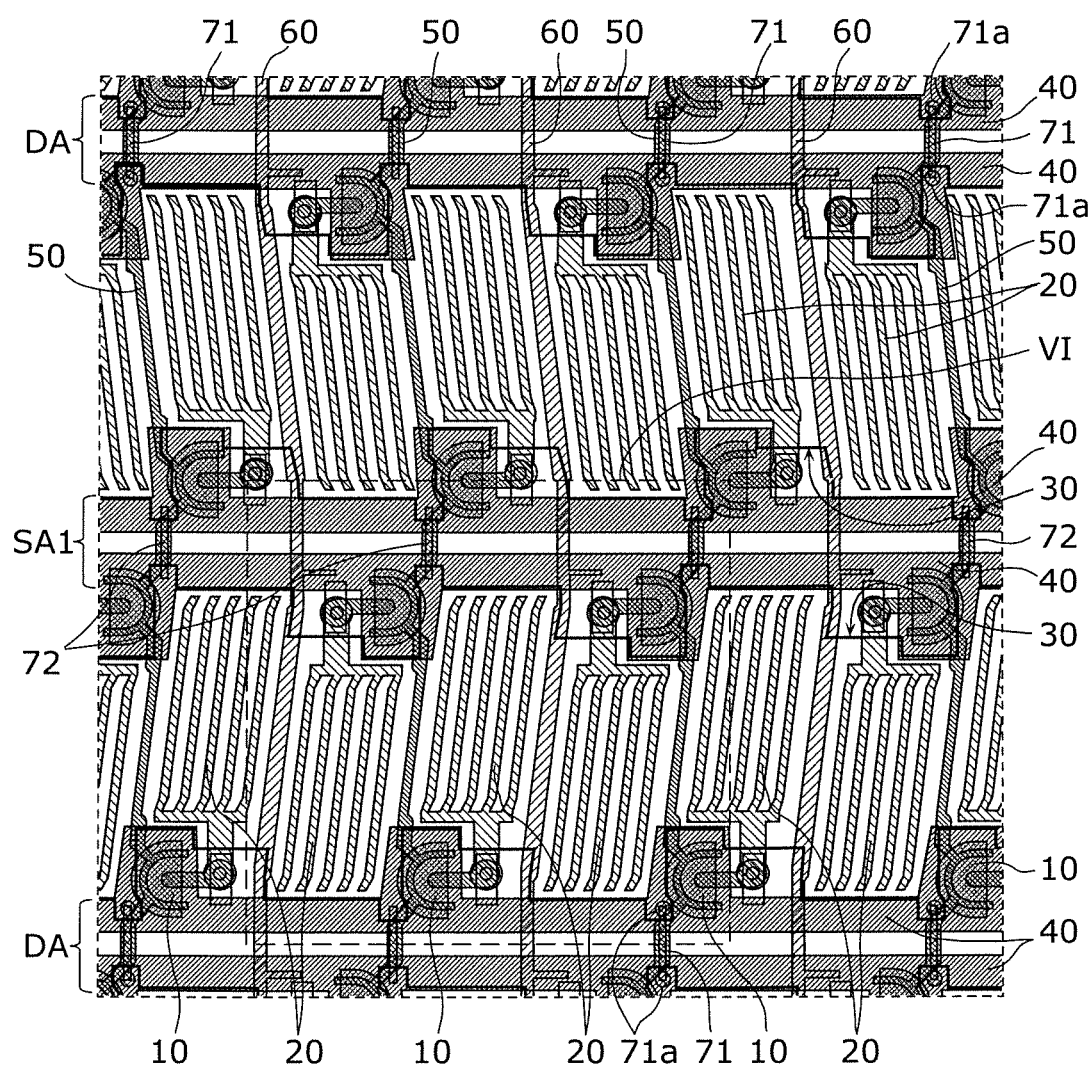
FIG. 5 is a plan view illustrating an example of a pixel configuration of the in-cell touch panel according to the first exemplary embodiment.
Figure 6:
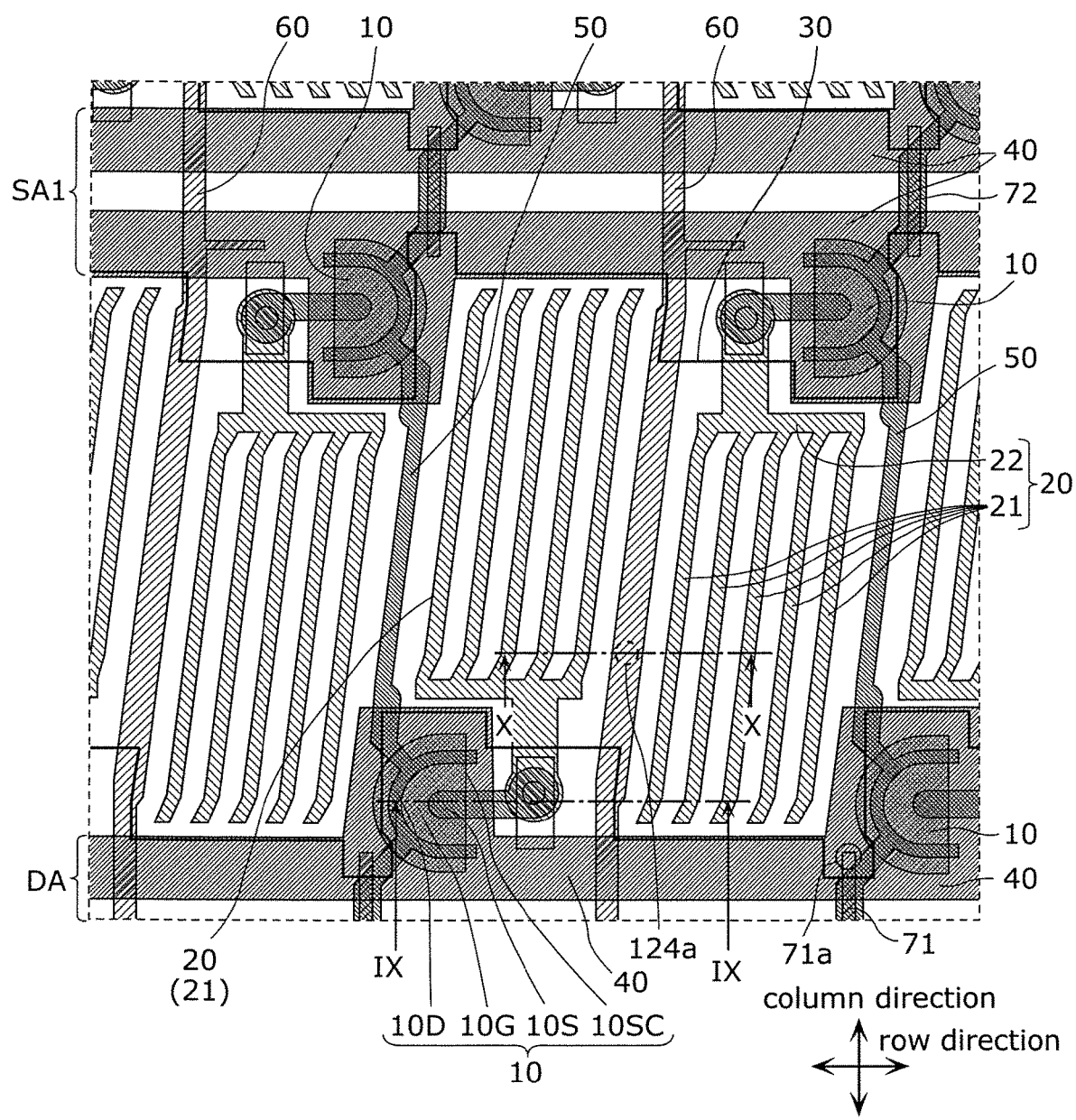
FIG. 6 is an enlarged plan view of the in-cell touch panel according to the exemplary embodiment in area VI surrounded by a broken line in FIG. 5.
Figure 7:
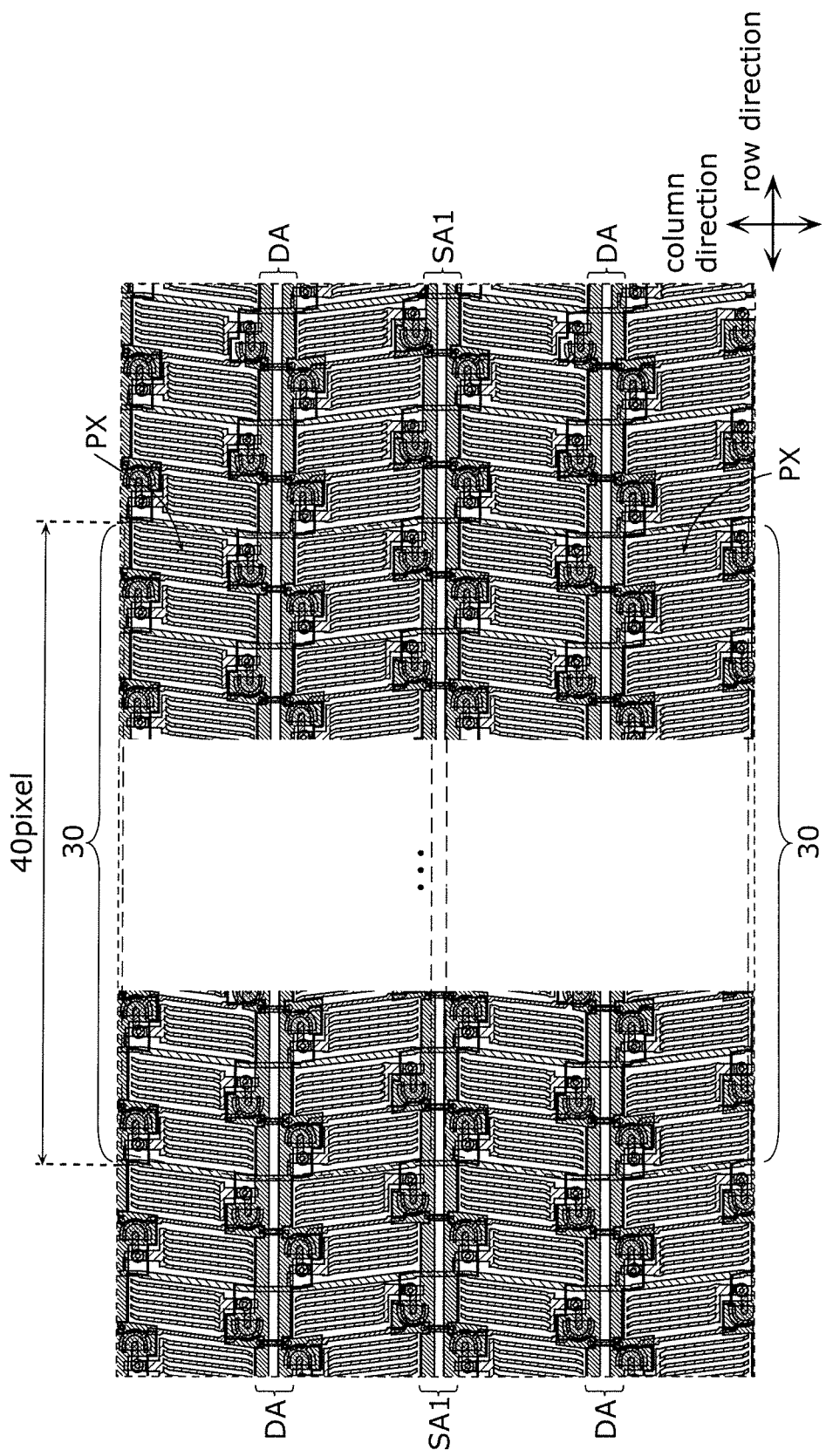
FIG. 7 is a view illustrating a repeating pattern of pixels in the in-cell touch panel according to the first exemplary embodiment.
Figure 8:
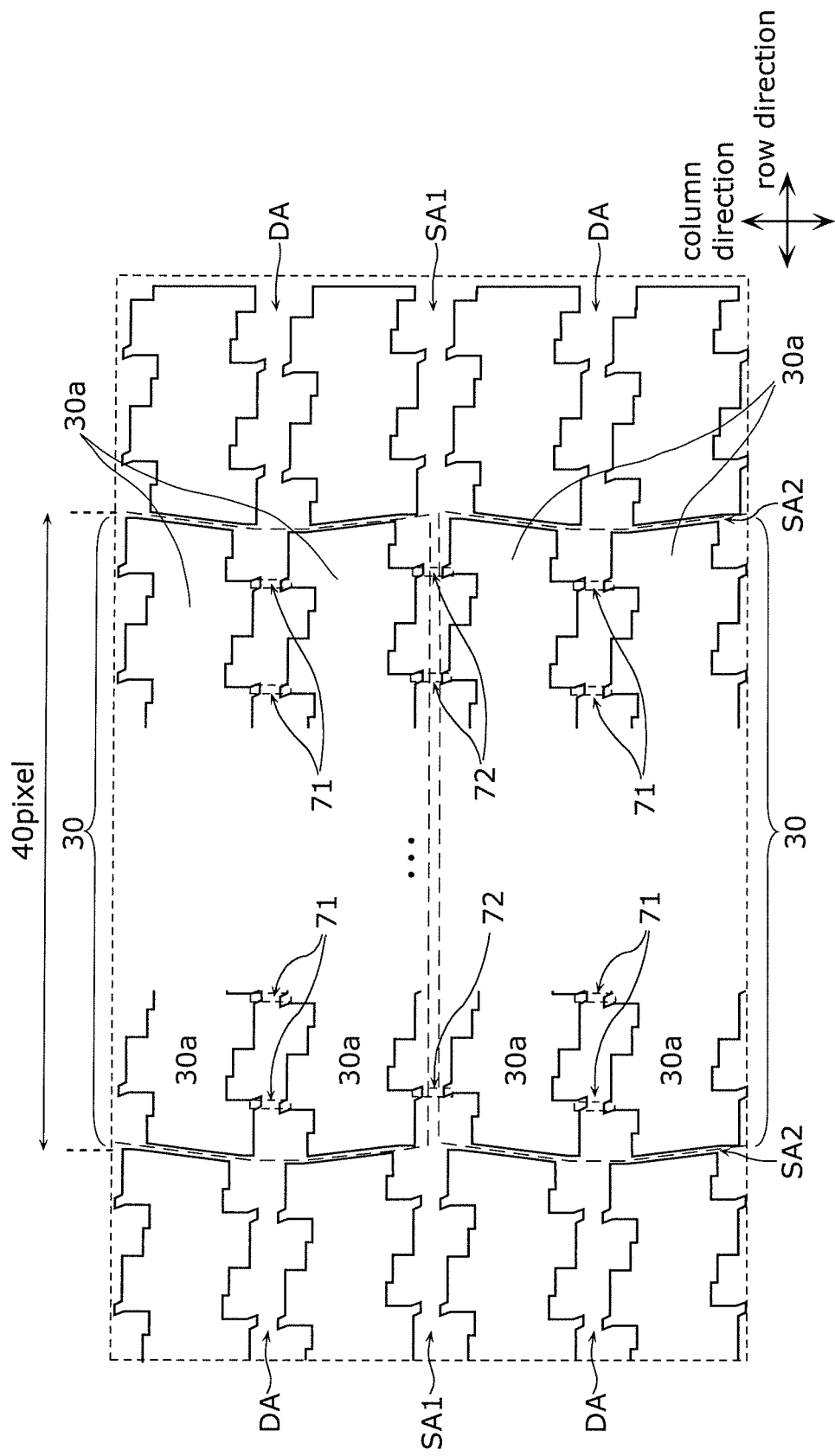
FIG. 8 is a diagram in which a common electrode is emphasized in FIG. 7.

Next, an example of a pixel configuration of in-cell touch panel 1 will be described with reference to FIGS. 5 to 8. FIG. 5 is a plan view illustrating an example of a configuration of pixel PX in in-cell touch panel 1 according to the first exemplary embodiment. FIG. 6 is an enlarged view of area VI surrounded by a broken line in FIG. 5. FIG. 7 is a diagram illustrating a repetition pattern of pixels in in-cell touch panel 1, and FIG. 8 is diagram in which a common electrode is emphasized in FIG. 7, illustrating a repletion pattern of common electrodes.

As illustrated in FIGS. 5 to 7, one pixel PX is provided with one transistor 10 and one pixel electrode 20.

A plurality of slits are formed in each pixel electrode 20, and each pixel electrode 20 has a plurality of line electrodes 21 extending in a stripe shape in the column direction. Each of the plurality of line electrodes 21 has a strip shape, and a plurality of slits extending in the column direction are formed in pixel electrode 20 to form a stripe shape. In each pixel electrode 20, all the line electrodes 21 are formed substantially in parallel, and an interval (slit width) between two adjacent line electrodes 21 is constant. Further, in each pixel electrode 20, the intervals of all the line electrodes 21 are the same. In each pixel PX, one ends in the longitudinal direction of the plurality of line electrodes 21 are coupled by a coupling electrode 22 extending along the row direction. That is, pixel electrode 20 in the present exemplary embodiment has a comb shape.

Line electrode 21 is inclined with respect to the row direction and the column direction in each pixel PX. In this case, in the present exemplary embodiment, the direction of line electrode 21 is inverted between two pixels PX adjacent in the column direction, and the line electrodes 21 are formed to have a substantially "<" shape in two columns in the column direction. That is, the plurality of pixel electrodes 20 arranged in the column direction are formed to have a zigzag shape along the column direction. Note that line electrode 21 may be formed in parallel to the column direction without being inclined.

The plurality of gate lines 40 extend linearly in the row direction. As described above, since in-cell touch panel 1 in the present exemplary embodiment has a dual-gate structure, two gate lines are provided in the boundary portion between two pixels PX adjacent in the column direction.

The plurality of data lines 50 extend in the column direction along the shape of line electrode 21 of pixel electrode 20. Specifically, each data line 50 is inverted in direction by two pixels PX adjacent in the column direction, and is formed to have a substantially "<" shape for two pixels in the column direction. That is, each data line 50 is formed to have a zigzag shape along the column direction. The plurality of gate lines 40 may extend linearly in the column direction.

Similarly to data lines 50, the plurality of touch lines 60 extend in the column direction along the shape of line electrode 21 of pixel electrode 20. Specifically, each touch line 60 is inverted in direction by two pixels PX adjacent in the column direction, and is formed to have a substantially "<" shape for two pixels in the column direction. That is, each touch line 60 is formed to have a zigzag shape along the column direction. The plurality of touch lines 60 may extend linearly in the column direction.

As illustrated in FIG. 8, each of a plurality of common electrodes 30, which are unit electrodes (touch electrodes) for detecting a touch position, is separated using first separation area SA1, which extends in the row direction, and second separation area SA2, which extends in the column direction with, as the touch-electrode boundaries. One common electrode 30 is provided across a plurality of pixels PX. For example, as illustrated in FIGS. 7 and 8, the size of one common electrode 30 is 40×40 pixels. That is, the length in each of the row direction and the column direction of one common electrode 30 is the length of 40 pixels. In this case, there are 40 contact portions with one touch line 60 in one common electrode 30. The size of one common electrode 30 is not limited to this but may be 32×32 pixels. Further, the shape of one common electrode 30 is not limited to a square but may be a rectangle.

Further, each of the plurality of common electrodes 30 is divided in a plurality of segment electrodes 30a with division area DA on gate line 40 as a boundary. That is, the plurality of segment electrodes 30a are arranged in the column direction. All segment electrodes 30a included in one common electrode 30 are electrically connected to each other by one touch line 60.

As illustrated in FIGS. 6 and 8, two segment electrodes 30a adjacent in the column direction are connected by first bridge line 71. First bridge line 71 laterally bridges two segment electrodes 30a adjacent in the column direction across one division area DA.

In the present exemplary embodiment, first bridge line 71 extends in the column direction. Specifically, first bridge line 71 overlaps with data line 50 in a planar view.

Further, first bridge line 71 is formed in an island shape and is formed in a different layer from common electrode 30 (segment electrode 30a). In the present exemplary embodiment, first bridge line 71 is formed in the same layer as touch line 60.

First bridge line 71 and segment electrode 30a are connected via contact hole 71a. Specifically, one end in the longitudinal direction of first bridge line 71 extending in the column direction is connected to one end of two segment electrodes 30a adjacent in the column direction via contact hole 71a. The other end in the longitudinal direction of first bridge line 71 is connected to the other end of two segment electrodes 30a adjacent in the column direction via contact hole 71a. As described later, touch line 60 and common electrode 30 (segment electrode 30a) are formed via one insulating film. Therefore, contact hole 71a is formed in the insulating film between touch line 60 and common electrode 30 (segment electrode 30a).

Contact hole 71a does not overlap with data line 50 in the planar view.

In the present exemplary embodiment, contact hole 71a overlaps with gate line 40 in the planar view.

First bridge line 71 across division area DA may be provided for each of the plurality of pixels PX arranged in the row direction, or may be formed in some of the plurality of pixels PX arranged in the row direction. Further, not all of first bridge lines 71 need to be connected to segment electrodes 30a.

As described above, two common electrodes 30 adjacent in the column direction are separated with an area above gate line 40 as first separation area SA1. As illustrated in FIG. 6, second bridge line 72 is provided in first separation area SA1. Second bridge line 72 extends over two common electrodes 30 adjacent in the column direction across one first separation area SA1. That is, second bridge line 72 is formed over segment electrode 30a of one common electrode 30 of two common electrodes 30 adjacent in the column direction and segment electrode 30a of the other common electrode 30 of two common electrodes 30 adjacent in the column direction.

However, two common electrodes 30 adjacent in the column direction are not connected by second bridge line 72. Specifically, no contact hole is formed in the insulating film between second bridge line 72 and common electrode 30, and second bridge line 72 and common electrode 30 are not connected. As thus described, although second bridge line 72 looks like first bridge line 71 at first glance, unlike first bridge line 71, second bridge line 72 is not connected to common electrode 30. That is, second bridge line 72 is a dummy bridge line of first bridge line 71.

Therefore, second bridge line 72 has the same shape as first bridge line 71 and extends in the column direction. Further, second bridge line 72 also overlaps with data line 50 in the planar view. Further, similarly to first bridge line 71, second bridge line 72 is formed in an island shape and is formed in the same layer as touch line 60. That is, second bridge line 72 and first bridge line 71 are formed in the same layer. Note that first bridge line 71 and second bridge line 72 do not overlap with pixel electrode 20 in the planar view.

Next, the cross-sectional structure of in-cell touch panel 1 will be described with reference to FIGS. 9 and 10 while referring to FIGS. 5 to 8.

Figure 9:
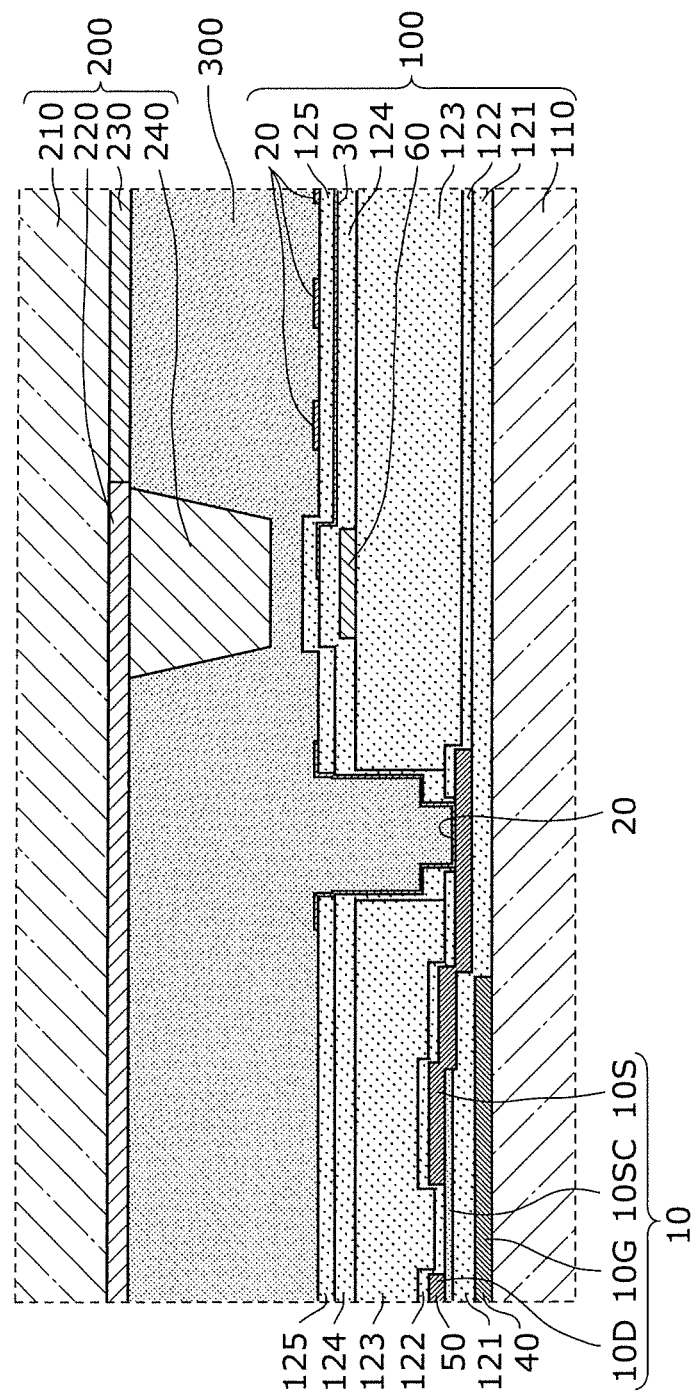
FIG. 9 is a sectional view of the in-cell touch panel according to the first exemplary embodiment, taken along line IX-IX in FIG. 6.
Figure 10:
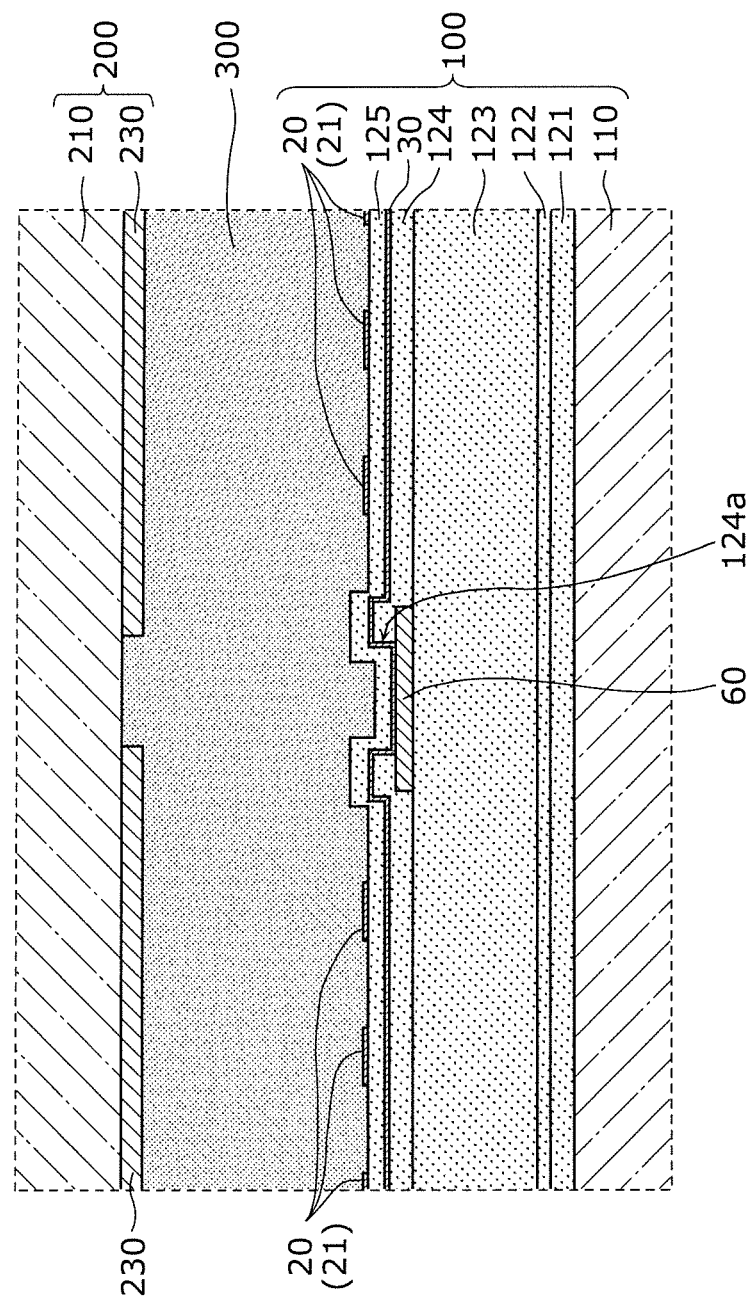
FIG. 10 is a sectional view of the in-cell touch panel according to the first exemplary embodiment, taken along line X-X in FIG. 6.

FIG. 9 is a sectional view of in-cell touch panel 1, taken along line IX-IX in FIG. 6 FIG. 10 is a sectional view of in-cell touch panel 1, taken along line X-X in FIG. 6

As illustrated in FIGS. 9 and 10, in-cell touch panel 1 is provided with first substrate 100, second substrate 200 facing first substrate 100, and liquid crystal layer 300 disposed between first substrate 100 and second substrate 200. In the present exemplary embodiment, first substrate 100 is located on the backlight 3 side, and second substrate 200 is located on the observer's side. Although not illustrated, liquid crystal layer 300 is sealed between first substrate 100 and second substrate 200 by a frame-shaped sealing member.

First substrate 100 is a TFT substrate having a TFT as transistor 10. Specifically, first substrate 100 is an active matrix substrate where a plurality of transistors 10 are arranged in a matrix. First substrate 100 is provided with not only transistor 10 but also various signal lines such as gate line 40, data line 50, and touch line 60, an insulating film that insulates between these signal lines, pixel electrode 20, common electrode 30, and the like. These members are formed above first transparent substrate 110. First transparent substrate 110 is a transparent substrate such as a glass substrate, for example.

As illustrated in FIG. 9, transistor 10 formed on first transparent substrate 110 is made up of gate electrode 10G, source electrode 10S, drain electrode 10D, and semiconductor layer 10SC serving as a channel layer. In the present exemplary embodiment, transistor 10 is a TFT with a bottom gate structure and is provided with gate electrode 10G formed on first transparent substrate 110, first insulating film 121 that is a gate insulator (GI) formed on gate electrode 10G, and semiconductor layer 10SC formed above gate electrode 10G via first insulating film 121. Source electrode 10S and drain electrode 10D are formed to cover a part of semiconductor layer 10SC. First insulating film 121 is formed all over first transparent substrate 110 so as to cover gate electrode 10G.

Gate electrode 10G may, for example, be constituted by a metal film having a two-layer structure of a molybdenum film and a copper film, or be constituted by a single-layer metal film made of a copper film or the like. First insulating film 121 may, for example, be constituted by an insulating film having a two-layer structure of a silicon oxide film and a silicon nitride film, or be constituted by a single insulating film of a silicon oxide film or a silicon nitride film. Semiconductor layer 10SC may, for example, be constituted by a semiconductor film having a two-layer structure of an i-amorphous silicon film and an n-amorphous silicon film, or be constituted by a semiconductor film having only one layer of the i-amorphous silicon film. Source electrode 10S and drain electrode 10D may, for example, be constituted by a metal film having a two-layer structure of a molybdenum film and a copper film, or be constituted by a single-layer metal film made of a copper film or the like.

Note that the materials of gate electrode 10G, source electrode 10S, drain electrode 10D, semiconductor layer 10SC, and first insulating film 121 are not limited to these. For example, as the material of semiconductor layer 10SC, an In—Ga—Zn—O-based oxide semiconductor or the like may be used.

As illustrated in FIG. 9, gate line 40 and data line 50 are formed in first substrate 100. Gate line 40 and data line 50 are formed above first transparent substrate 110.

Gate line 40 is formed in the same layer as gate electrode 10G. That is, gate line 40 and gate electrode 10G are formed by patterning the same metal film. Gate line 40 and gate electrode 10G are formed in a first wiring layer (GAL layer) that is a metal layer.

Data line 50 is formed in the same layer as source electrode 10S and drain electrode 10D. That is, data line 50, source electrode 10S, and drain electrode 10D are formed by patterning the same metal film. Data line 50, source electrode 10S, and drain electrode 10D are formed in a second wiring layer (SD layer) that is a metal layer above the first wiring layer.

First insulating film 121 is formed as a first insulating layer (GI layer) between the first wiring layer (GAL layer) and the second wiring layer (SD layer). First insulating film 121 is formed all over first transparent substrate 110 so as to cover gate line 40 and gate electrode 10G. The first wiring layer, first insulating film 121, and the second wiring layer are TFT layers where transistor 10 that is a TFT is formed.

Source electrode 10S of transistor 10 is connected to pixel electrode 20 through a contact hole. Meanwhile, drain electrode 10D of transistor 10 is connected to data line 50. Specifically, a part of data line 50 is drain electrode 10D.

Second insulating film 122 is formed as a second insulating layer (PAS layer) on first insulating film 121 so as to cover data line 50 and the source-drain electrode of transistor 10. That is, data line 50 and the source-drain electrode of transistor 10 is formed between first insulating film 121 and second insulating film 122. Second insulating film 122 is formed all over first insulating film 121. Second insulating film 122 is constituted by an inorganic insulating film made of an inorganic material such as a silicon nitride film, for example. Second insulating film 122 which is an inorganic insulating film can be formed by chemical vapor deposition (CVD), for example.

Third insulating film 123 is formed on second insulating film 122 as a third insulating layer (OPAS layer) Third insulating film 123 is formed all over second insulating film 122. In the present exemplary embodiment, a thickness of third insulating film 123 is larger than a thickness of second insulating film 122. Specifically, the thickness of third insulating film 123 is 10 times or more the thickness of second insulating film 122, and is 3000 nm as an example. Thereby, the distance in the thickness direction between the wiring such as gate line 40 and data line 50 and common electrode 30 can be increased, so that a parasitic capacitance formed between the wiring such as gate line 40 and data line 50 and common electrode 30 can be reduced. In addition, by increasing the thickness of third insulating film 123, the unevenness of the TFT layer caused by formation of transistor 10, gate line 40, and data line 50 can be reduced, and the TFT layer can be planarized. Thereby, third insulating film 123 with a planarized surface can be formed, so that common electrode 30 immediately above third insulating film 123 can be formed in a flat planar shape. That is, third insulating film 123 functions as a planarization layer.

Third insulating film 123 is constituted by an organic insulating film made of an organic material containing carbon. Third insulating film 123 which is an organic insulating film can be formed by, for example, applying and curing a liquid organic material. Thereby, third insulating film 123 can be easily increased in thickness, so that the surface of third insulating film 123 can be easily planarized all over pixels PX.

Touch line 60 is formed on third insulating film 123. Touch line 60 is made of a low resistance material such as metal. For example, touch line 60 is a metal film made of copper or the like. In the present exemplary embodiment, touch line 60 is a copper line made of a copper film. Touch line 60 is formed in a third wiring layer (CMT layer) that is a metal layer on the second wiring layer. Hence touch line 60 is provided in a different layer from gate line 40 and data line 50.

Although not illustrated, first bridge line 71 and second bridge line 72 illustrated in FIG. 6 are formed on the same layer as the layer (CMT layer) on which touch lines 60 are formed. That is, similarly to touch line 60, first bridge line 71 and second bridge line 72 are formed in the third wiring layer (CMT layer), and touch line 60, first bridge line 71, and second bridge line 72 are formed by patterning the same metal film. Therefore, first bridge line 71 and the second bridge line 72 are copper wires made of a copper film.

Fourth insulating film 124 is formed as a fourth insulating layer (TPS layer) on third insulating film 123 and touch line 60. Fourth insulating film 124 is formed all over third insulating film 123 so as to cover touch line 60. Accordingly, touch line 60 is formed between third insulating film 123 and fourth insulating film 124. Fourth insulating film 124 is constituted by an inorganic insulating film made of an inorganic material such as a silicon nitride film, for example.

Common electrode 30 is formed on fourth insulating film 124. Common electrode 30 is a transparent electrode made of a transparent metal oxide such as indium tin oxide (ITO), for example. In the present exemplary embodiment, common electrode 30 is an ITO film and can be formed by sputtering, for example. Common electrode 30 is formed in a fourth wiring layer (MIT layer) on the third wiring layer.

As described above, a plurality of common electrodes 30 are formed. Specifically, as illustrated in FIG. 3, common electrodes 30 are arranged in a matrix in a state of being separated from each other in the row direction and the column direction.

Further, the plurality of common electrodes 30 are formed all over pixels PX in image display area 1a. As a result, the wiring such as gate line 40 and data line 50 is covered by common electrode 30, so that the electric field generated in the wiring such as gate line 40 and data line 50 can be shielded by common electrode 30. That is, the electric field generated in the TFT layer can be shielded by common electrode 30. Accordingly, the flexibility in designing the shape and size of pixel electrode 20 formed on common electrode 30 is improved, thus facilitating improvement in light transmittance and aperture ratio of pixel PX.

As illustrated in FIG. 10, common electrode 30 is connected to one touch line 60 through contact hole 124a formed in fourth insulating film 124. Thereby, at the time of performing the touch position detection drive, a change in capacitance of common electrode 30 at the position touched by the user can be detected via touch line 60 connected to the concerned common electrode 30. Contact hole 71a (cf. FIG. 6) connecting two segment electrodes 30a adjacent in the column direction and first bridge line 71 is also formed in fourth insulating film 124. Contact hole 124a and contact hole 71a can be formed by performing dry etching or wet etching on fourth insulating film 124, for example. A material constituting common electrode 30 (ITO in the present exemplary embodiment) is embedded into these contact hole 124a and contact hole 71a.

In addition, although the ITO film has a relatively high resistance value, by connecting touch line 60 made of such a low-resistance metal film to common electrode 30, the resistance of common electrode 30 made of the ITO film can be reduced, and a time constant of common electrode 30 can be lowered. That is, at the time of performing the image display drive, touch line 60 can be used as a common line.

Furthermore, by providing common electrode 30 on touch line 60, touch line 60 can be covered with common electrode 30. As a result, as compared to a case where touch line 60 is provided on common electrode 30, it is possible to inhibit corrosion of touch line 60 made of a metal material vulnerable to corrosion.

Fifth insulating film 125 is formed as a fifth insulating layer (UPS layer) on fourth insulating film 124 and common electrode 30. Fifth insulating film 125 is formed all over fourth insulating film 124 so as to cover common electrode 30. Fifth insulating film 125 is constituted by an inorganic insulating film made of an inorganic material such as a silicon nitride film, for example.

Pixel electrode 20 is formed on fifth insulating film 125. Pixel electrode 20 faces common electrode 30 via fifth insulating film 125. Pixel electrode 20 is a transparent electrode made of a transparent metal oxide such as indium tin oxide, for example. In the present exemplary embodiment, pixel electrode 20 is an ITO film similarly to common electrode 30, and can be formed by sputtering, for example. Pixel electrode 20 is formed in a fifth wiring layer (PIT layer) on the fourth wiring layer.

Although not illustrated, an alignment film may be formed all over fifth insulating film 125 so as to cover pixel electrode 20. In order to align the initial alignment angles of the liquid crystal molecules in a certain direction, the alignment film is rubbed.

Next, second substrate 200 will be described. Second substrate 200 is a counter substrate facing first substrate 100. As illustrated in FIGS. 9 and 10, second substrate 200 includes second transparent substrate 210, black matrix 220 formed on second transparent substrate 210, and color filter 230.

Hence, second substrate 200 is a color filter substrate (CF substrate) having color filter 230.

Similarly to first transparent substrate 110, second transparent substrate 210 is a transparent substrate such as a glass substrate, for example.

Black matrix 220 is a black light shielding layer, and is made of, for example, carbon black. Black matrix 220 is formed on a surface of second transparent substrate 210 on the liquid crystal layer 300 side. Black matrix 220 is formed to cover gate line 40. Black matrix 220 may be formed to cover not only gate lines 40 but also data lines 50 and touch lines 60. In this case, black matrix 220 is formed in a lattice shape as a whole.

Color filter 230 is formed for pixel PX. Specifically, color filter 230 includes a red color filter, a blue color filter, and a green color filter respectively corresponding to red pixel PXR, green pixel PXG, and blue pixel PXB. Each color filter is formed in an area between black matrices 220 (i.e., an opening of black matrix 220).

Second substrate 200 includes a plurality of spacers 240. Spacer 240 is formed on second transparent substrate 210 so as to protrude toward first substrate 100. Spacer 240 is a columnar member for maintaining a constant distance (cell gap) between first substrate 100 and second substrate 200. By providing spacer 240, the thickness of liquid crystal layer 300 can be easily maintained constant. As an example, spacer 240 has a cylindrical trapezoidal shape, and has a circular shape in a planar view at the upper and the lower end. Spacer 240 is made of a resin material such as acrylic resin and can be deformed elastically. Spacer 240 can be formed in a predetermined pattern by photolithography, for example.

A pair of polarizing plates (not illustrated) are bonded to in-cell touch panel 1 configured as described above. For example, one of the pair of polarizing plates is formed on the outer surface of first substrate 100, and the other of the pair of polarizing plates is formed on the outer surface of second substrate 200. The pair of polarizing plates are arranged so that the polarization directions are orthogonal to each other. Further, a retardation plate may be bonded to the pair of polarizing plates.

As described above, according to in-cell touch panel 1 in the present exemplary embodiment, common electrodes 30, arranged in the column direction and connected one-to-one with touch lines 60 extending in the column direction, each includes a plurality of segment electrodes 30a divided with an area on gate line 40 as division area DA. That is, each common electrode 30 constituting one unit electrode (touch electrode) for detecting a touch position is divided above gate line 40 so as not to overlap with gate line 40, and is divided in a plurality of segment electrodes 30a. Each of the plurality of segment electrodes 30a included in one common electrode 30 is connected by at least one touch line 60.

With this configuration, even when each of the plurality of common electrodes 30 is provided over a plurality of pixels PX, since common electrode 30 is divided in a portion facing gate line 40, it is possible to prevent common distortion caused by a coupling capacitance (Cgc) between gate line 40 and common electrode 30. It is thereby possible to prevent the degradation of the image quality due to the common distortion caused by the coupling capacitance (Cgc) between gate line 40 and common electrode 30.

Here, the plurality of segment electrodes 30a included in one common electrode 30 that constitutes one unit electrode for detecting a touch position are desirably at the same potential. However, when common electrode 30 separated into a plurality of segment electrodes 30a, it becomes difficult to maintain the plurality of segment electrodes 30a at the same potential. Therefore, it is conceivable to form a bridge portion connecting two segment electrodes 30a by linearly extending, in the column direction, a part of the opposing portions of two segment electrodes 30a that sandwich division area DA.

However, when a bridge portion connecting two segment electrodes 30a is formed in division area DA by extending a part of segment electrode 30a, a bridge portion is not provided in first separation area SA1 between two common electrodes 30. In this case, common electrode 30 has a structure where a bridge portion exists in division area DA whereas no bridge portion exists in first separation area SA1. As a result, a portion where the bridge portion, which is a part of common electrode 30, and gate line 40 face each other and a portion where the bridge portion and gate line 40 do not face each other are mixed. As a result, the common distortion caused by the coupling capacitance between gate line 40 and common electrode 30 becomes discontinuous, and display unevenness occurs. This might cause the quality of a display image to be degraded.

Therefore, in in-cell touch panel 1 according to the present exemplary embodiment, first bridge line 71 is provided to laterally bridge two segment electrodes 30a adjacent in the column direction across division area DA, and first bridge line 71 and segment electrode 30a are connected via contact hole 71a. That is, first bridge line 71 is formed in a different layer from common electrode 30, and two segment electrodes 30a are coupled to each other by first bridge line 71.

Thereby, the discontinuity of the coupling capacitance between gate line 40 and common electrode 30 in image display area 1a can be reduced, so that it is possible to prevent the degradation of the image quality due to the common distortion caused by the coupling capacitance (Cgc) between gate line 40 and common electrode 30.

In the present exemplary embodiment, first bridge line 71 is formed in the same layer (CMT layer) as touch line 60. Specifically, similarly to touch line 60, first bridge line 71 is made of a low-resistance material such as copper.

This makes it possible to connect two segment electrodes 30a by using the low-resistance first bridge line 71 while reducing the coupling capacitance between gate line 40 and common electrode 30. Therefore, even when common electrode 30 is divided into the plurality of segment electrodes 30a, the potential difference between the plurality of segment electrodes 30a can be reduced.

In the present exemplary embodiment, first bridge line 71 overlaps with data line 50 in the planar view.

Thereby, even when first bridge line 71 is provided, the influence of the coupling capacitance between gate line 40 and common electrode 30 can be minimized.

In this case, in the present exemplary embodiment, contact hole 71a for connecting first bridge line 71 and segment electrode 30a does not overlap with data line 50 but overlaps with gate line 40 in the planar view. That is, contact hole 71a is formed above gate line 40, avoiding an area above data line 50.

First bridge line 71 across division area DA may be provided for each of the plurality of pixels PX arranged in the column direction, or may be formed in some of the plurality of pixels PX arranged in the column direction. However, in order to reduce the discontinuity of common distortion due to a coupling capacitance between the wiring, first bridge line 71 is more preferably provided for each of the plurality of pixels PX arranged in the column direction. In this case, not all of first bridge lines 71 each provided for each of the plurality of pixels PX arranged in the column direction need to be connected to segment electrodes 30a. That is, so long as the wiring pattern has continuity for each pixel PX, not all first bridge lines 71 need to be electrically connected to segment electrodes 30a.

In the present exemplary embodiment, second bridge line 72 extends over two common electrodes 30 adjacent in the column direction across first separation area SA1. However, second bridge line 72 and common electrode 30 are not connected. Specifically, second bridge line 72 is a dummy bridge line having the same shape as first bridge line 71.

As described above, in in-cell touch panel 1 according to the present exemplary embodiment, first bridge line 71 is provided in division area DA between two segment electrodes 30a adjacent in the column direction, and second bridge line 72 having the same shape as first bridge line 71 is provided in first separation area SA1 between two common electrodes 30 adjacent in the column direction. Thereby, even when the coupling capacity between gate line 40 and first bridge line 71 occurs in division area DA due to the provision of first bridge line 71, by providing second bridge line 72, it is possible to generate a coupling capacitance substantially equal to the coupling capacitance between gate line 40 and first bridge line 71 in first separation area SA1 as well. Therefore, the discontinuity of the common distortion caused by the coupling capacitance between these wiring can be reduced. That is, even when common distortion caused by a coupling capacitance between the wiring occurs, the common distortion can be uniformly generated in image display area 1a as a whole. It is thereby possible to prevent the display unevenness due to the discontinuity of the common distortion caused by the coupling capacitance between wiring.

The number of touch lines 60 across the common electrodes 30 arranged in the column direction only needs be the same as that of the common electrodes 30 arranged in the column direction. Therefore, as in the in-cell touch panel illustrated in FIG. 11, when there is a space between touch lines 60 across common electrodes 30 arranged in the column direction, dummy touch line 60A which is not connected to common electrode 30 may be provided between two adjacent touch lines 60. Dummy touch line 60A is formed, for example, on data line 50 along data line 50. Dummy touch line 60A is not connected to any wiring in image display area 1a, but may be drawn out to frame area 1b, and the common voltage (Vcom) or a predetermined voltage such as a gate-off voltage (Vgoff) may be applied to dummy touch line 60A. The predetermined voltage does not need to be applied to dummy touch line 60A. That is, dummy touch line 60A may be in a floating state. Further, dummy touch line 60A may be provided also in second separation area SA2 between two common electrodes 30 adjacent in the row direction. Dummy touch line 60A is formed in the same layer as touch line 60.

Figure 11:
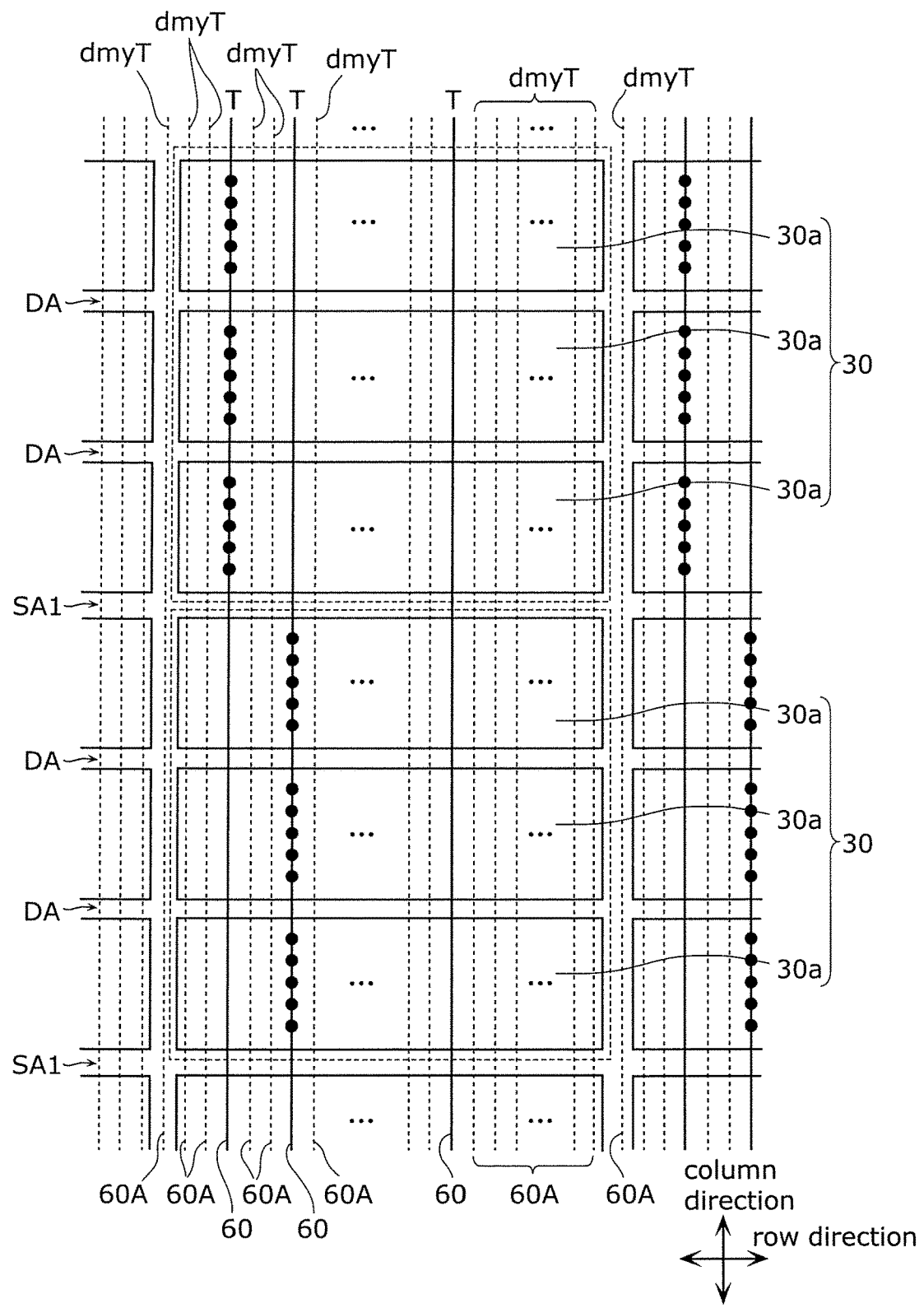
FIG. 11 is a diagram an example of arrangement of common electrodes and wiring in the in-cell touch panel according to Modification 1 of the first exemplary embodiment.
Figure 12:
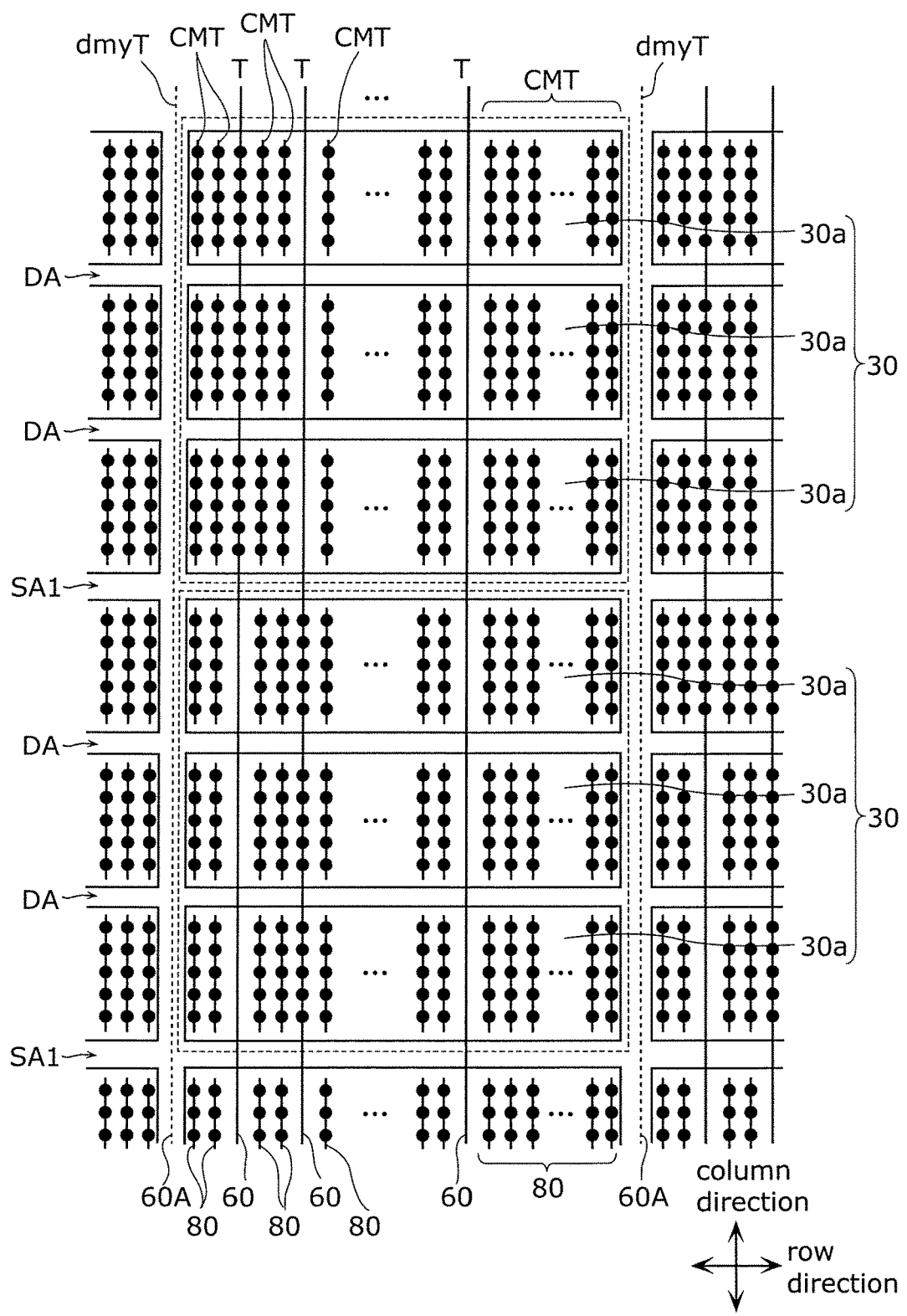
FIG. 12 is a diagram illustrating an example of arrangement of common electrodes and wiring in an in-cell touch panel according to Modification 2 of a second exemplary embodiment.

In this case, the touch panel may further be configured as an in-cell touch panel illustrated in FIG. 12. The in-cell touch panel illustrated in FIG. 12 has a configuration where dummy touch line 60A across common electrodes 30 arranged in the column direction is replaced with first bridge line 80 in the in-cell touch panel illustrated in FIG. 11. First bridge line 80 is formed in the same layer as touch line 60.

First bridge line 80 extends in the column direction so as to overlap with each of the plurality of segment electrodes 30a included in one common electrode 30, and is connected to each of the plurality of segment electrodes 30a included in the concerned one common electrode 30. Respective first bridge lines 80 are connected to all segment electrodes 30a included in one common electrode 30 via contact holes.

A plurality of first bridge lines 80 are provided for each of the plurality of common electrodes 30 arranged in the column direction. That is, first bridge line 80 extending in the column direction is divided by first separation area SA1 to be a mesh common line formed in a dashed shape along the column direction. As thus described, by replacing dummy touch line 60A across the plurality of segment electrodes 30a with first bridge line 80, the resistance of common electrode 30 can be reduced.

In FIG. 12 as well, dummy touch lines 60A may be provided in second separation area SA2 between two common electrodes 30 adjacent in the row direction, similarly to the in-cell touch panel illustrated in FIG. 11.

Second Exemplary Embodiment

Figure 13:
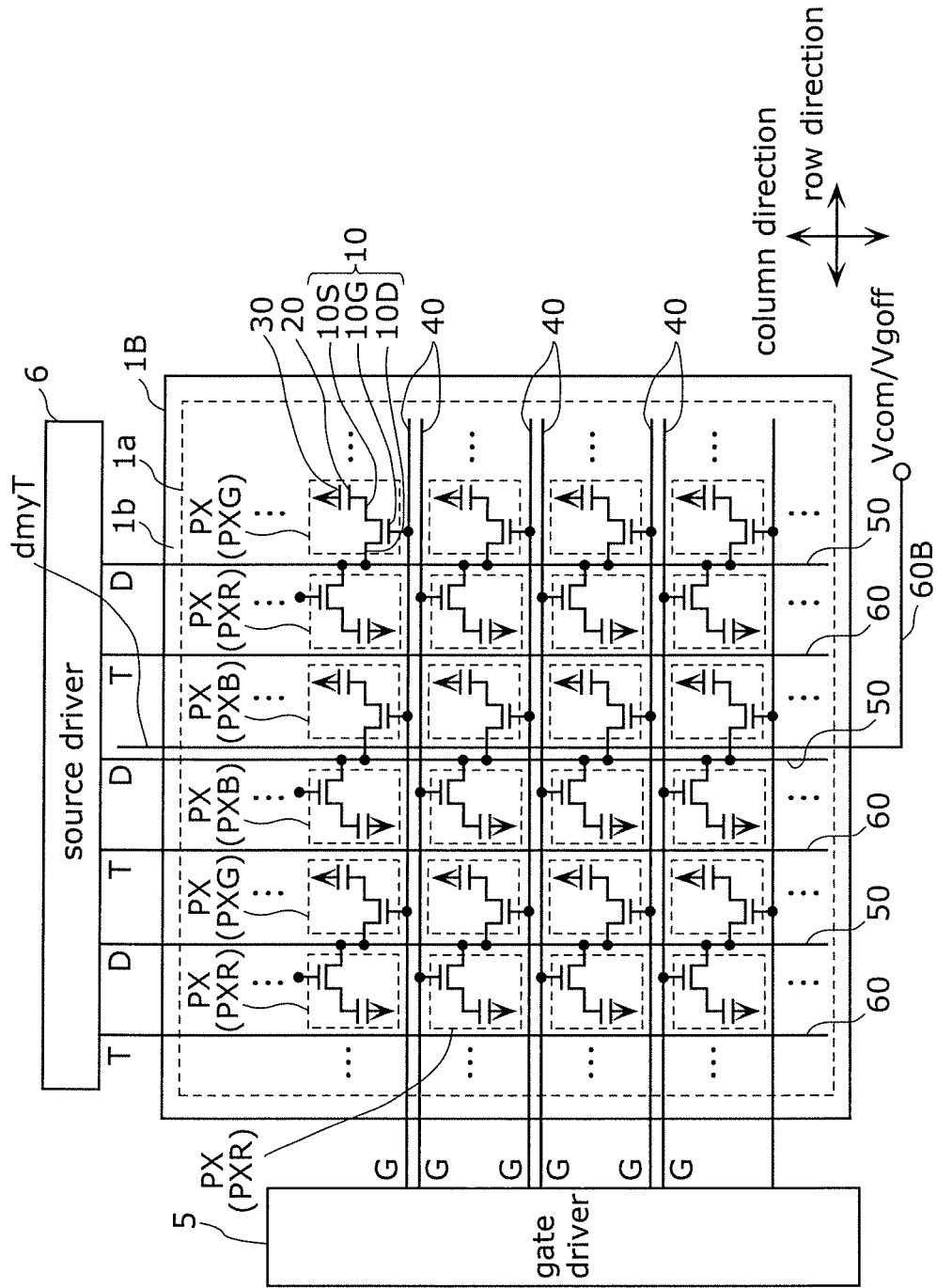
FIG. 13 is a diagram illustrating a pixel circuit of the in-cell touch panel used in the image display device according to the second exemplary embodiment.
Figure 14:
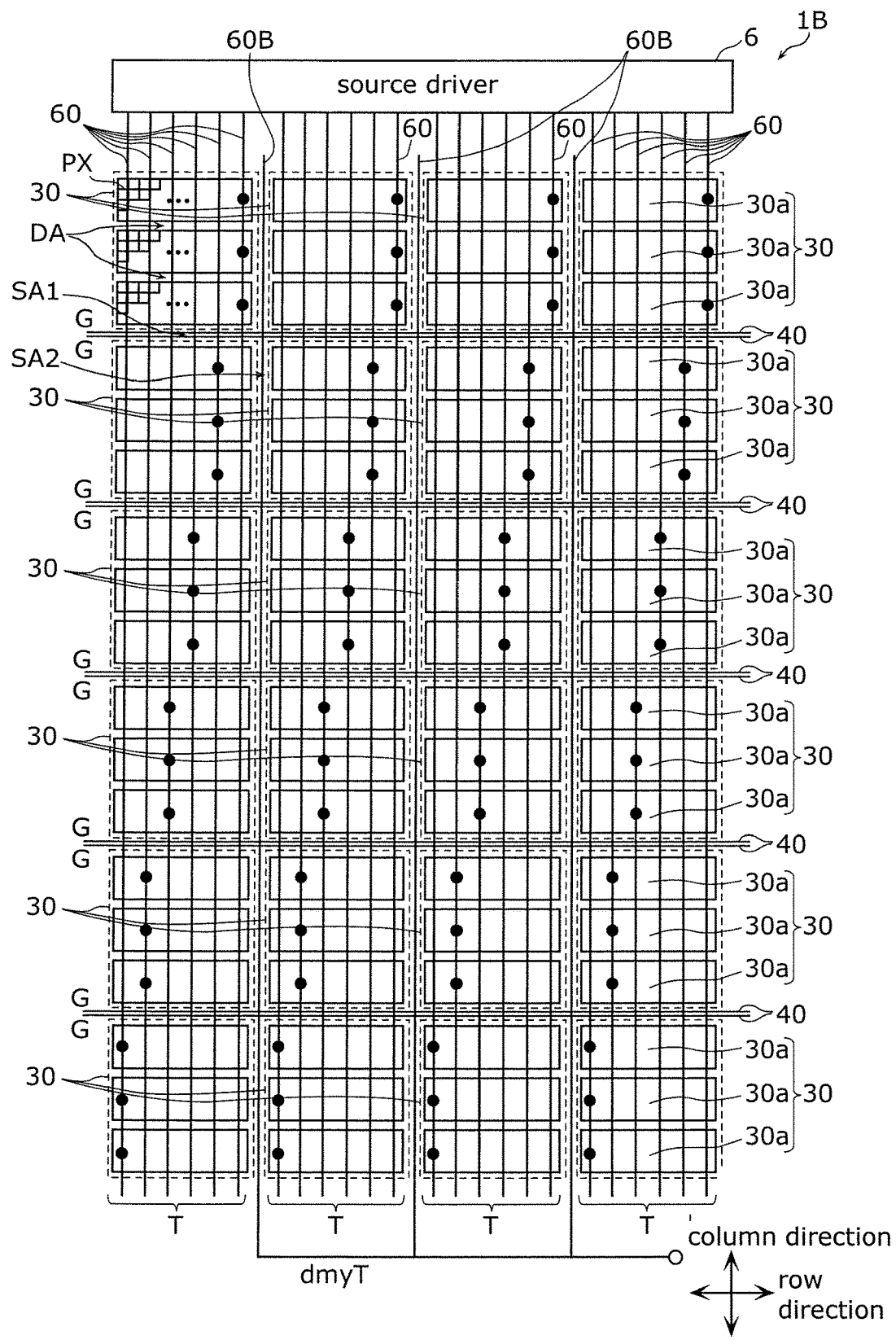
FIG. 14 is a diagram illustrating an example of arrangement of common electrodes in the in-cell touch panel according to the second exemplary embodiment.

Next, a pixel circuit of in-cell touch panel 1B used in an image display device according to a second exemplary embodiment will be described with reference to FIGS. 13 and 14. FIG. 13 is a diagram illustrating a pixel circuit of in-cell touch panel 1B according to the second exemplary embodiment. FIG. 14 is a diagram illustrating an example of arrangement of common electrodes 30 in the same in-cell touch panel 1B. In FIG. 13, "G" indicates gate line 40, "D" indicates data line 50, "T" indicates touch line 60, and "dmyT" indicates dummy touch line 60B. In FIG. 14, a black circle indicates a contact portion between common electrode 30 and touch line 60.

As illustrated in FIG. 14, in-cell touch panel 1B in the present exemplary embodiment has image display area 1a and frame area 1b, similarly to in-cell touch panel 1 in the first exemplary embodiment.

As in the first exemplary embodiment, the In-cell touch panel 1B is provided with transistor 10 and pixel electrode 20 provided in each of a plurality of pixels PX, common electrode 30 facing pixel electrode 20, a plurality of gate lines 40 (scanning lines) extending in a row direction that is a first direction, a plurality of data lines 50 (video signal lines) extending in a column direction that is a second direction orthogonal to the first direction, and a plurality of touch lines 60 extending in the column direction that is the second direction.

Further, in-cell touch panel 1B in the present exemplary embodiment includes dummy touch line 60B that does not contribute to detection of a touch position at the time of the user touching in-cell touch panel 1B. In the present exemplary embodiment, a plurality of dummy touch lines 60B are provided. The plurality of dummy touch lines 60B extend in the same direction as the plurality of data lines 50. That is, the plurality of dummy touch lines 60B extend in the column direction similarly to touch lines 60. Dummy touch lines 60B and touch lines 60 extend in the column direction in parallel.

In-cell touch panel 1B according to the present exemplary embodiment is also a liquid crystal display panel having a touch sensing function by a capacitance method that is a self-capacitance method. Therefore, common electrode 30 is also a touch electrode that forms a capacitance with pixel electrode 20 and is also used at the time of touch position detection drive.

Each of the plurality of dummy touch lines 60B extending in the column direction is provided in a second separation area SA2 that separates two adjacent common electrodes 30 in the row direction. That is, dummy touch line 60B does not overlap with common electrode 30, and is provided between two common electrodes 30 adjacent in the column direction. Accordingly, similarly to touch line 60, dummy touch line 60B is provided in the boundary portion between two pixels PX adjacent in the row direction in image display area 1a. Specifically, dummy touch line 60B is provided between two pixel columns adjacent in the row direction.

Further, since second separation area SA2 is an area on data line 50, dummy touch line 60B is located on data line 50. Specifically, dummy touch line 60B is provided on data line 50 along data line 50.

As described above, unlike touch line 60, dummy touch line 60B does not contribute to detection of a touch position. Therefore, dummy touch line 60B is not electrically connected to any of the plurality of common electrodes 30. That is, a contact portion connecting dummy touch line 60B and common electrode 30 is not formed in any of the plurality of common electrodes 30.

In the present exemplary embodiment, dummy touch line 60B is not connected to any wiring in image display area 1a, but is drawn out to frame area 1b, and a fixed voltage is applied to dummy touch line 60B. Specifically, same voltage level as the common voltage (Vcom) is applied to dummy touch line 60B in a similar manner as common electrode 30 so that dummy touch line 60B and common electrode 30 have the same potential when displaying images. Note that the voltage applied to dummy touch line 60B is not limited to the common voltage but may be a predetermined voltage such as a gate-off voltage (Vgoff). The predetermined voltage does not need to be applied to dummy touch line 60B. That is, dummy touch line 60B may be in a floating state.

Next, an example of a pixel configuration of in-cell touch panel 1B will be described with reference to FIGS. 15 and 16. FIG. 16 is a plan view illustrating an example of a configuration of pixel PX in in-cell touch panel 1B according to the second exemplary embodiment. FIG. 16 is an enlarged view of area XVI surrounded by a broken line in FIG. 15.

Figure 15:
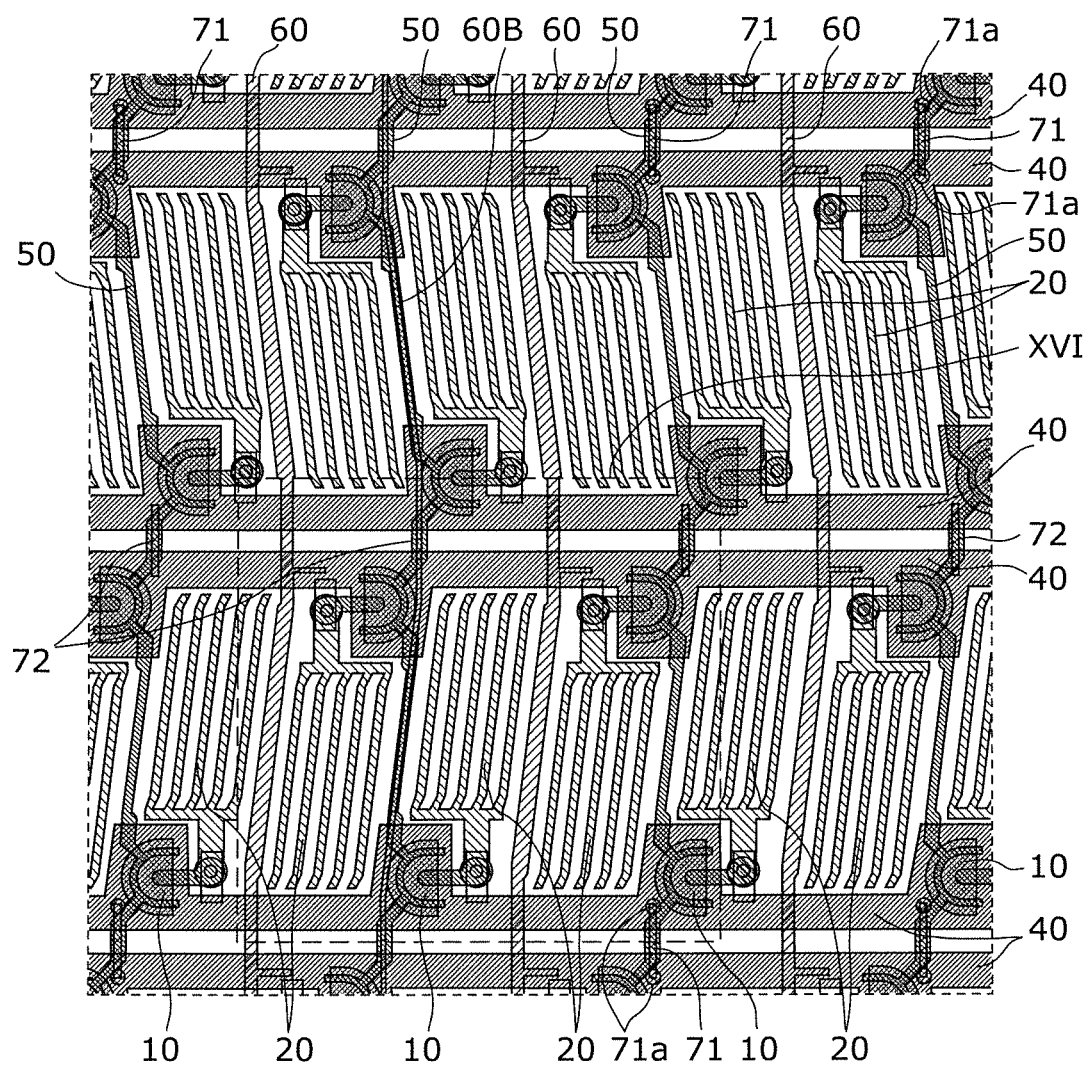
FIG. 15 is a plan view illustrating an example of a configuration of a pixel of the in-cell touch panel according to the second exemplary embodiment.
Figure 16:
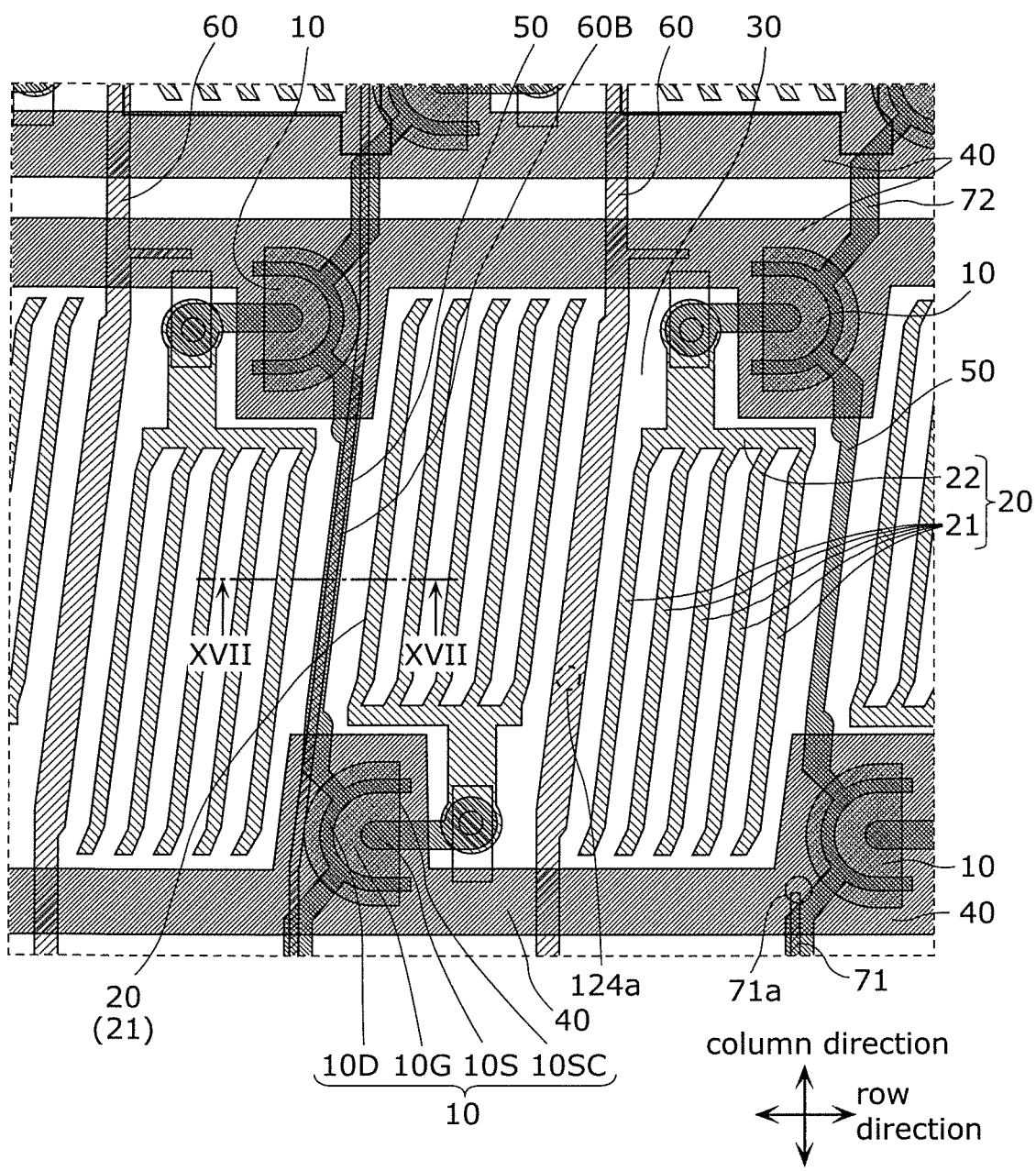
FIG. 16 is an enlarged plan view of the in-cell touch panel according to the exemplary embodiment in area XVI surrounded by a broken line in FIG. 15.

As illustrated in FIGS. 15 and 16, in-cell touch panel 1B according to the present exemplary embodiment has a configuration where dummy touch line 60B is provided in the first exemplary embodiment. Dummy touch line 60B is formed along data line 50. Specifically, dummy touch line 60B is formed so as to overlap with data line 50 in a planar view.

Figure 17:
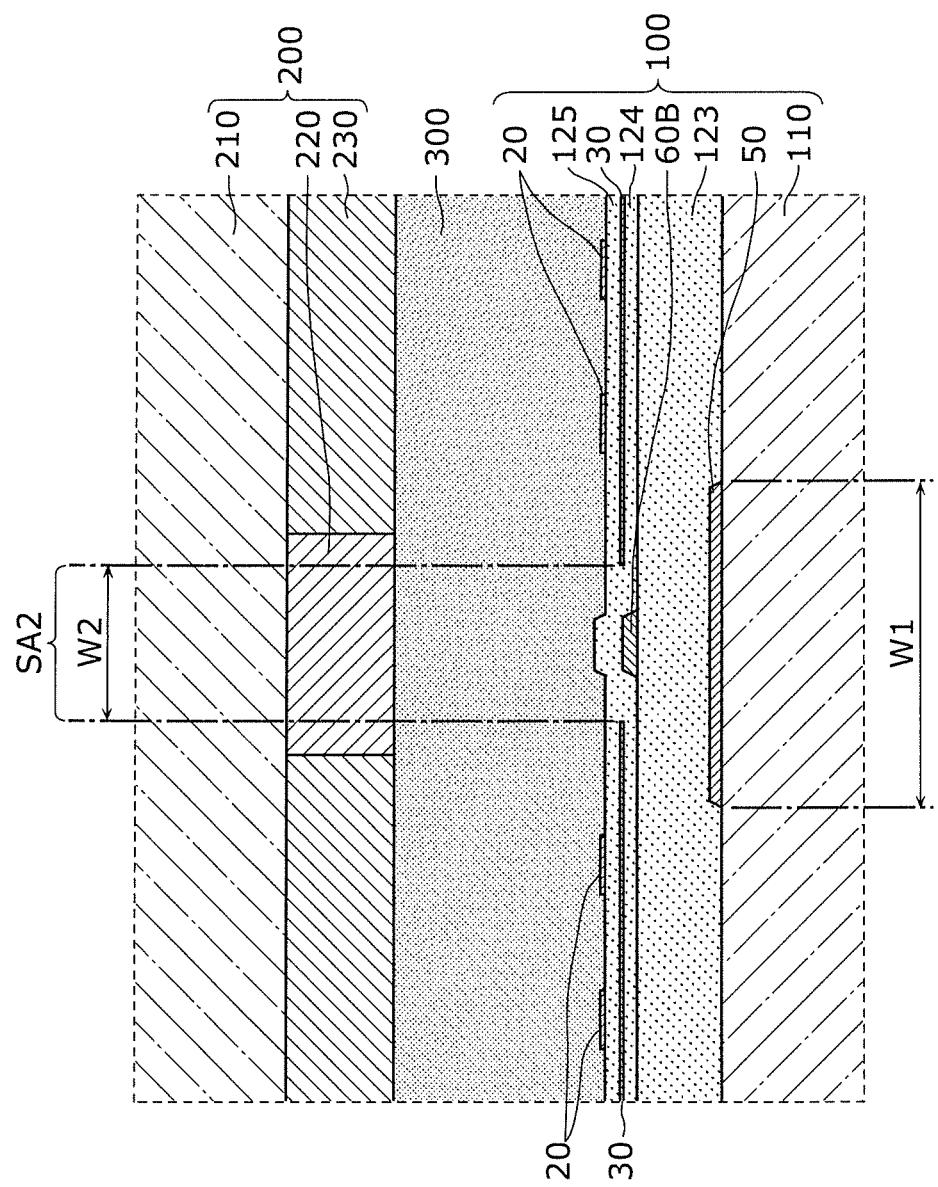
FIG. 17 is a sectional view of the in-cell touch panel according to the exemplary embodiment, taken along line XVII-XVII in FIG. 16.

Next, a cross-sectional structure of in-cell touch panel 1B will be described with reference to FIG. 17. FIG. 17 is a sectional view of in-cell touch panel 1B, taken along line XVII-XVII in FIG. 16. In FIG. 17, first insulating film 121 and second insulating film 122 are omitted.

As illustrated in FIG. 17, width W1 of data line 50 provided in second separation area SA2 is larger than width W2 of second separation area SA2. That is, width W1 of data line 50 provided in second separation area SA2 is larger than the interval between two common electrodes 30 that are adjacent in the row direction with second separation area SA2 as a boundary. For example, width W1 of data line 50 is preferably equal to or more than twice width W2 of second separation area SA2.

Touch line 60 and the dummy touch line 60B are formed on third insulating film 123. Touch line 60 and the dummy touch line 60B are made of a low-resistance material such as a metal. For example, touch line 60 and the dummy touch line 60B are metal films made of copper or the like. In the present exemplary embodiment, touch line 60 and the dummy touch line 60B are copper lines made of copper films. Touch line 60 and the dummy touch line 60B are formed in a third wiring layer (CMT layer) that is a metal layer on the second wiring layer. Therefore, touch line 60 and dummy touch line 60B are provided in a different layer from gate line 40 and data line 50.

As illustrated in FIG. 17, dummy touch line 60B is formed on data line 50. That is, dummy touch line 60B overlaps with data line 50. Dummy touch line 60B does not overlap with common electrode 30. In other words, dummy touch line 60B is disposed to be shifted from common electrode 30 in the planar view.

The width of dummy touch line 60B is smaller than the width of the second separation area SA2. That is, the width of dummy touch line 60B is smaller than the interval between two common electrodes 30 that are adjacent in the row direction with second separation area SA2 as the boundary. Further, the width of dummy touch line 60B is smaller than the distance between the concerned dummy touch line 60B and common electrode 30 adjacent to dummy touch line 60B.

Meanwhile, the width of dummy touch line 60B needs to have a certain size. In this case, the width of dummy touch line 60B is preferably equal to or more than 0.2 times the width of second separation area SA2. That is, the width of dummy touch line 60B is preferably equal to or more than 0.2 times the interval between two common electrodes 30 that are adjacent in the row direction with second separation area SA2 as the boundary.

Although not illustrated, first bridge line 71 and second bridge line 72 are formed in the same layer (CMT layer) where touch lines 60 and dummy touch lines 60B are formed. That is, similarly to touch line 60, first bridge line 71 and second bridge line 72 are formed in the third wiring layer (CMT layer), and touch line 60, dummy touch line 60B, first bridge line 71, and second bridge line 72 are formed by patterning the same metal film.

Fourth insulating film 124 is formed as a fourth insulating layer (TPS layer) on third insulating film 123, touch lines 60, and dummy touch lines 60B. Thus, touch line 60 and dummy touch line 60B are formed between third insulating film 123 and fourth insulating film 124. Fourth insulating film 124 is formed all over third insulating film 123 so as to cover touch lines 60 and dummy touch lines 60B.

The black matrix 220 of the second substrate 200 may be formed so as to cover not only gate lines 40 but also data lines 50, touch lines 60, and dummy touch lines 60B.

As described above, in-cell touch panel 1B according to the present exemplary embodiment is provided with a plurality of common electrodes 30 arranged in the row direction and the column direction, a plurality of touch lines 60 connected to the plurality of common electrodes 30 arranged in the column direction, and dummy touch line 60B formed in the same layer as the plurality of touch lines 60 and not connected to the plurality of common electrodes 30. Two common electrodes 30 adjacent in the row direction are separated from each other with an area on data line 50 as a separation area (second separation area SA2), and dummy touch line 60B is provided in the separation area.

With this configuration, even when a plurality of common electrodes 30 are separated by the separation area and a gap (slit) exists between two common electrodes 30 adjacent in the row direction, dummy touch line 60B is provided between two common electrodes 30 adjacent in the row direction (in second separation area SA2). That is, at least a part of the width-direction portion of the gap between two common electrodes 30 adjacent in the row direction is closed by dummy touch line 60B. Thereby, an electromagnetic field from data line 50 existing below second separation area SA2 can be shielded (electromagnetically shielded) by dummy touch line 60B, so that it is possible to prevent unintended rotation of liquid crystal molecules existing in the vicinity of the gap between two common electrodes 30 adjacent in the row direction due to the electromagnetic field from data line 50. It is thus possible to prevent the occurrence of display unevenness caused by the electromagnetic field from data line 50.

As thus described, according to in-cell touch panel 1B in the present exemplary embodiment, even when a plurality of common electrodes 30 are separated from each other, it is possible to prevent the degradation of the image quality.

In the present exemplary embodiment, a fixed voltage is applied to dummy touch line 60B.

Thereby, the electromagnetic field from data line 50 existing below second separation area SA2 can be more effectively shielded by dummy touch line 60B. It is thereby possible to further prevent the occurrence of the display unevenness.

In this case, the fixed voltage to be applied to dummy touch line 60B may be the common voltage to be applied to common electrode 30.

Accordingly, dummy touch line 60B and common electrode 30 can be set to the same potential, so that it is possible to prevent unintended rotation of liquid crystal molecules existing in the vicinity of the gap between two common electrodes 30 adjacent in the row direction. It is thereby possible to further prevent the occurrence of the display unevenness.

Figure 18:
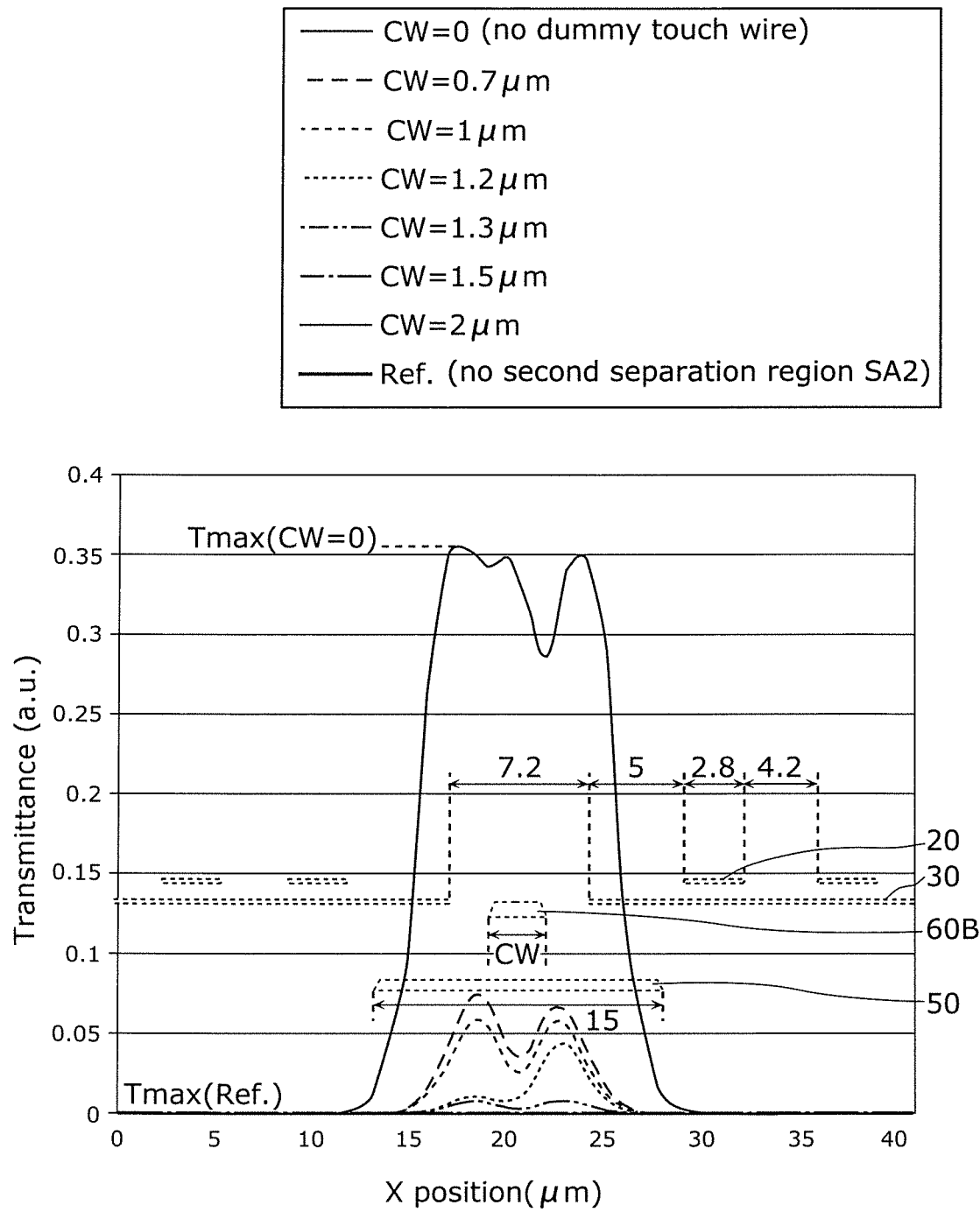
FIG. 18 is a diagram illustrating a relationship between a width of a dummy touch line and a light transmittance around a gap between two adjacent common electrodes in the cross section illustrated in FIG. 17.

Here, a simulation was performed concerning the relationship between the width of dummy touch line 60B and the shielding effect, and the result will be described with reference to FIG. 18. FIG. 18 is a diagram illustrating the relationship between the width of dummy touch line 60B and light transmittance around the gap between two adjacent common electrodes 30 in the cross section illustrated in FIG. 17.

In this simulation, a 3D simulation was performed using width CW of dummy touch line 60B as a parameter. Further, the shielding effect of dummy touch line 60B is estimated based on a transmittance profile for light transmitted through second separation area SA2 (gap between common electrodes 30) provided with dummy touch line 60B when in-cell touch panel 1B is displayed in black.

As film thickness conditions of each layer were set as follows: the thickness of first transparent substrate 110 is 20 µm, the thickness of data line 50 (SD layer) is 0.3 µm, the thickness of third insulating film 123 (OPAS layer) is 2 µm, the thickness of fourth insulating film 124 (TPS layer) is 0.3 µm, the thickness of common electrode 30 (MIT layer) is 0.03 m, the thickness of fifth insulating film 125 (UPS layer) is 0.35 µm, the thickness of pixel electrode 20 (PIT layer) is 0.07 µm, the thickness of liquid crystal layer 300 is 3.7 µm, the thickness of the color filter 230 (black matrix) is 3.4 µm, and the thickness of second transparent substrate 210 is 20 µm.

Potential conditions of each electrode were set as follows considering the potential difference between a common voltage (Vcom) a gate-off voltage (Vgoff) in an actual device: the potential of pixel electrode 20 is 0 V, the potential of common electrode 30 is 0 V, the potential of dummy touch line 60B is 0 V, and the potential of data line 50 is 12 V. When an in-cell touch panel is actually used, the potential setting is not limited to these conditions. For example, the gate-off voltage may be a negative potential, and the potential of common electrode 30 may be a positive potential.

Further, the other dimensional conditions are set as follows: the distance between two common electrodes 30 adjacent in the row direction (the width of second separation area SA2) is 7.2 µm, the width of data line 50 is 15 µm, the width of line electrode 21 of pixel electrode 20 is 2.8 µm, the interval (pitch) between two adjacent line electrodes 21 is 4.2 µm, and the distance from the opening end of common electrode 30 to line electrode 21 is 5 µm.

Then, under these conditions, the light transmittance at the time of a change in width CW of dummy touch line 60B was calculated. Specifically, width CW of dummy touch line 60B was changed to 0 µm (when dummy touch line 60B does not exist), 0.7 µm, 1.0 µm, 1.2 µm, 1.3 µm, 1.5 µm, and 2 µm. "Ref" indicates a case where second separation area SA2 does not exist (a case where there is no gap between two adjacent common electrodes 30).

As a result, the result illustrated in FIG. 18 was obtained. In FIG. 18, the maximum value (Tmax) of the transmittance in the transmittance profile for each width CW of dummy touch line 60B is normalized and illustrated based on the maximum value of the transmittance of "Ref".

As illustrated in FIG. 18, when width CW of dummy touch line 60B is 0 µm (when dummy touch line 60B does not exist), it can be seen that the transmittance is high, which is equivalent to white display. This is because the liquid crystal molecules existing in the vicinity of second separation area SA2 have been rotated by the electromagnetic field from data line 50 existing below second separation area SA2.

Then, from the result illustrated in FIG. 18, it can be seen that by setting width CW of dummy touch line 60B to 1.5 µm or more, the same shielding effect as in the case where second separation area SA2 does not exist can be obtained. That is, width CW of dummy touch line 60B is preferably about 0.2 times (=1.5/7.2) or more the width of second separation area SA2.

(Other Modifications)

As described above, the in-cell touch panel, the image display device, and the like according to the present disclosure have been described based on the first and second exemplary embodiments. However, the present disclosure is not limited to the first and second exemplary embodiments.

For example, in the first and second exemplary embodiments, the plurality of line electrodes 21 in pixel electrode 20 have been coupled to each other by one coupling electrode 22, but the present disclosure is not limited to this. Specifically, each of both ends in the longitudinal direction of the plurality of line electrodes 21 may be coupled by the coupling electrode 22.

In the first and second exemplary embodiments, data line 50 and drain electrode 10D of transistor 10 have been connected, and pixel electrode 20 and source electrode 10S of transistor 10 have been connected. However, the present disclosure is not limited to this. For example, data line 50 and source electrode 10S of transistor 10 may be connected, and pixel electrode 20 and drain electrode 10D of transistor 10 may be connected.

In the first and second exemplary embodiments, gate line 40 has extended in the row direction and data line 50 and touch line 60 have extended in the column direction. However, the present disclosure is not limited to this. Gate line 40 may extend in the column direction, and data line 50 and touch line 60 may extend in the row direction. That is, the first direction may be the column direction and the direction orthogonal to the first direction may be the row direction. In this case, the three types of pixels of red pixel PXR, green pixel PXG, and blue pixel PXB may be periodically arranged in the column direction in a predetermined arrangement.

In the first and second exemplary embodiments, the dual gate structure has been formed where two gate lines 40 are provided in each boundary portion between two pixels PX adjacent in the column direction. However, the present disclosure is not limited to this. For example, a single gate structure may be formed where one gate line 40 is provided for each boundary portion between two pixels PX adjacent in the column direction may be used.

In addition, the present disclosure includes forms obtained by performing various modifications conceivable by those skilled in the art with respect to the first and second exemplary embodiments and the modifications, and forms achieved by arbitrarily combining in a freely selected manner the components and the functions in the first and second exemplary embodiments and the modifications in a scope not deviating from the gist of the present disclosure.

What is claimed is:

1. An in-cell touch panel having an image display area made up of pixels arranged in a first direction and a second direction intersecting the first direction, the in-cell touch panel comprising:
    transistors and pixel electrodes respectively provided in the pixels;
    common electrodes arranged in the first direction and the second direction, respectively facing one or more of the pixel electrodes and provided separately from each other;
    gate lines that extend along the first direction and supply gate signals to the transistors respectively;
    data lines that extend along the second direction and supply data signals to the transistors respectively;
    touch lines that extend along the second direction and are each connected to a corresponding one of the common electrodes; and
    a first bridge line laterally bridging two of the segment electrodes adjacent in the second direction across one of the division areas,
    wherein each common electrode has segment electrodes divided with a division area on the gate line,
    segment electrodes included in one of the common electrodes are connected by at least one of the touch lines,
    the first bridge line and each of the two of the segment electrodes are connected via a contact hole, and
    the first bridge line extends in the second direction so as to overlap with the segment electrodes included in the one of the common electrodes, and be connected to the segment electrodes included in the one of the common electrodes.

2. The in-cell touch panel according to claim 1, wherein the first bridge line is formed in a different layer from the common electrode.

3. The in-cell touch panel according to claim 1, wherein the first bridge line is formed in a same layer as the touch line.

4. The in-cell touch panel according to claim 1, wherein the contact hole overlaps with the gate line in a planar view.

5. The in-cell touch panel according to claim 1, wherein the contact hole does not overlap with the data line in a planar view.

6. The in-cell touch panel according to claim 1, wherein the first bridge line overlaps with the data line in a planar view.

7. The in-cell touch panel according to claim 1, wherein the first bridge line is formed in an island shape.

8. The in-cell touch panel according to claim 1, wherein two of the common electrodes adjacent in the second direction are separated from each other with the separation area on the gate line, the in-cell touch panel includes a second bridge line laterally bridging the two of the common electrodes adjacent in the second direction across the separation area, and the second bridge line is not electrically connected to any of the two of the common electrodes.

9. The in-cell touch panel according to claim 1, wherein a plurality of the first bridge lines are provided in the one of the common electrodes.

10. An in-cell touch panel having an image display area made up of pixels arranged in a first direction and a second direction intersecting the first direction, the in-cell touch panel comprising:
   transistors and pixel electrodes respectively provided in the pixels;
   common electrodes arranged in the first direction and the second direction, respectively facing one or more of the pixel electrodes and provided separately from each other;
   gate lines that extend along the first direction and supply gate signals to the transistors respectively;
   data lines that extend along the second direction and supply data signals to the transistors respectively;
   touch lines that extend along the second direction and are each connected to a corresponding one of the common electrodes; and
   a dummy touch line extending along the second direction, formed in a same layer as the touch lines, and not electrically connected to any of the common electrodes,
   wherein each common electrode has segment electrodes divided with a division area on the gate line,
   segment electrodes included in one of the common electrodes are connected by at least one of the touch lines,
   wherein the touch lines are connected one-by-one with the common electrodes arranged in the second direction among the common electrodes,
   two of the common electrodes adjacent in the first direction are separated from each other with a separation area on the data line, and
   the dummy touch line is provided in the separation area.

11. The in-cell touch panel according to claim 10, wherein a fixed voltage is applied to the dummy touch line, and
   the fixed voltage is a common voltage to be applied to the common electrode.

12. The in-cell touch panel according to claim 10, wherein a width of the data line is larger than a width of the separation area.

13. The in-cell touch panel according to claim 10, wherein a width of the dummy touch line is equal to or more than 0.2 times a width of the separation area.

14. The in-cell touch panel according to claim 10, wherein a width of the dummy touch line is smaller than a distance between the dummy touch line and the common electrode.

15. The in-cell touch panel according to claim 10, wherein a width of the data line is equal to or more than twice a width of the separation area.

16. The in-cell touch panel according to claim 10, comprising:
   a first insulating film formed on each of the gate lines;
   a second insulating film formed on the first insulating film;
   a third insulating film that is formed on the second insulating film and is thicker than the second insulating film; and
   a fourth insulating film formed on the third insulating film,
   wherein the third insulating film is made of an organic material,
   the data lines are formed between the first insulating film and the second insulating film,
   the touch lines and the dummy touch lines are formed between the third insulating film and the fourth insulating film, and
   the common electrodes are formed on the fourth insulating film.

17. The in-cell touch panel according to claim 10, wherein the dummy touch line is offset from any of the common electrodes in a planar view.

18. An in-cell touch panel having an image display area made up of pixels arranged in a first direction and a second direction orthogonal to the first direction, the in-cell touch panel comprising:
   transistors and pixel electrodes respectively provided in the pixels;
   common electrodes arranged in the first direction and the second direction, respectively facing one or more of the pixel electrodes and provided separately from each other;
   gate lines that extend along the first direction and supply gate signals to the transistors respectively;
   data lines that extend along the second direction and supply data signals to the transistors respectively;
   touch lines that extend along the second direction and are each connected to a corresponding one of the common electrodes; and
   a dummy touch line that extends along the second direction, is formed in a same layer as the touch lines, and is electrically isolated from any of the common electrodes,
   wherein each touch line is connected with a corresponding one of the common electrodes arranged in the second direction,
   two of the common electrodes adjacent in the first direction are separated from each other with a separation area on the data line as, and
   the dummy touch line is provided in the separation area.

* * * * *